US012666064B2

(12) United States Patent
Sjöberg et al.

(10) Patent No.: US 12,666,064 B2
(45) Date of Patent: Jun. 23, 2026

(54) INDEPENDENT SUBPICTURE FILM GRAIN

(71) Applicant: Telefonaktiebolaget LM Ericsson (publ), Stockholm (SE)

(72) Inventors: Rickard Sjöberg, Stockholm (SE); Martin Pettersson, Vallentuna (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 34 days.

(21) Appl. No.: 18/572,272

(22) PCT Filed: Jun. 10, 2022

(86) PCT No.: PCT/EP2022/065841
§ 371 (c)(1),
(2) Date: Dec. 20, 2023

(87) PCT Pub. No.: WO2023/274688
PCT Pub. Date: Jan. 5, 2023

(65) Prior Publication Data
US 2024/0205439 A1 Jun. 20, 2024

Related U.S. Application Data

(60) Provisional application No. 63/216,262, filed on Jun. 29, 2021.

(51) Int. Cl.
H04N 19/44 (2014.01)
H04N 19/17 (2014.01)
(52) U.S. Cl.
CPC ............. H04N 19/44 (2014.11); H04N 19/17 (2014.11)

(58) Field of Classification Search
CPC ...... H04N 19/44; H04N 19/17; H04N 19/117; H04N 19/157; H04N 19/70; H04N 19/85; H04N 19/174
See application file for complete search history.

(56) References Cited

U.S. PATENT DOCUMENTS

| | | | |
|---|---|---|---|
| 2006/0133686 A1* | 6/2006 | Gomila ................ | H04N 19/176 382/254 |
| 2015/0181233 A1* | 6/2015 | Ramasubramonian ...................... | H04N 19/463 375/240.16 |

(Continued)

FOREIGN PATENT DOCUMENTS

WO          2021122367 A1      6/2021

OTHER PUBLICATIONS

International Search Report and Written Opinion for PCT/EP2022/065841 mailed Sep. 29, 2022, 10 pages.

(Continued)

*Primary Examiner* — Tat C Chio
(74) *Attorney, Agent, or Firm* — Rothwell, Figg, Ernst & Manbeck, P.C.

(57) ABSTRACT

According to one aspect, a method is provided for applying film grain to a picture decoded from a bitstream. The method includes decoding region information from syntax elements in the bitstream. The method includes deriving, based on the region information, a number of regions in the picture, wherein the number of regions is at least two. The method includes deriving, based on the region information, a region raster-scan order for a first region of the at least two regions. The method includes decoding the first region, wherein the decoding of the first region comprises applying film grain to the first region in accordance with the region raster-scan order.

23 Claims, 14 Drawing Sheets

(56)        References Cited

U.S. PATENT DOCUMENTS

| | | | | |
|---|---|---|---|---|
| 2017/0332085 | A1* | 11/2017 | Ramasubramonian | ..................... |
| | | | | H04N 19/167 |
| 2020/0413055 | A1* | 12/2020 | Kusakabe | ............ H04N 19/119 |
| 2021/0368176 | A1* | 11/2021 | Bross | ................... H04N 19/625 |

OTHER PUBLICATIONS

Ouedraogo, N., "AHG12: On subpictures merging for VVC," Joint Video Experts Team (JVET) of ITU-T SG 16 WP 3 and ISO/IEC JTC 1/SC 29/WG 11, Document: JVET-Q0411, 17th Meeting: Brussels, BE, Jan. 7-17, 2020, 5 pages.
Office Action for ROC (Taiwan) Patent Application No. 111123804 mailed May 22, 2023, 18 pages.
Office Action for ROC (Taiwan) Patent Application No. 111123804 mailed Sep. 23, 2023, 6 pages.

* cited by examiner

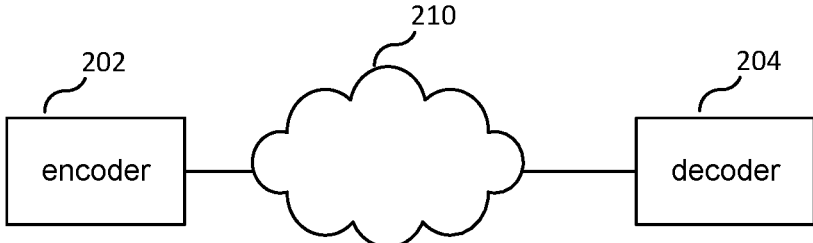
FIG. 2

500
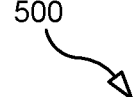
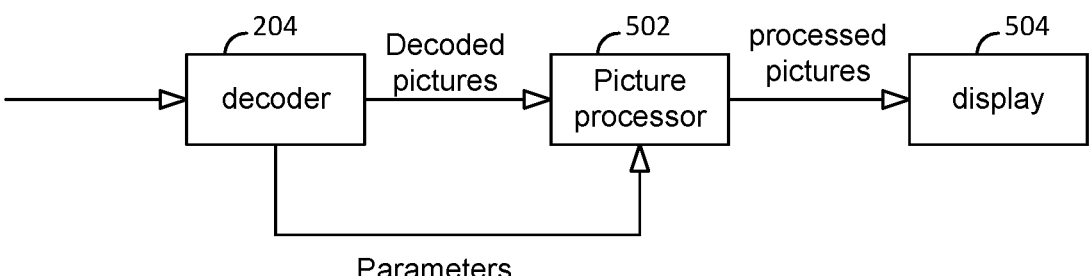
FIG. 5

(a)

(b)

700

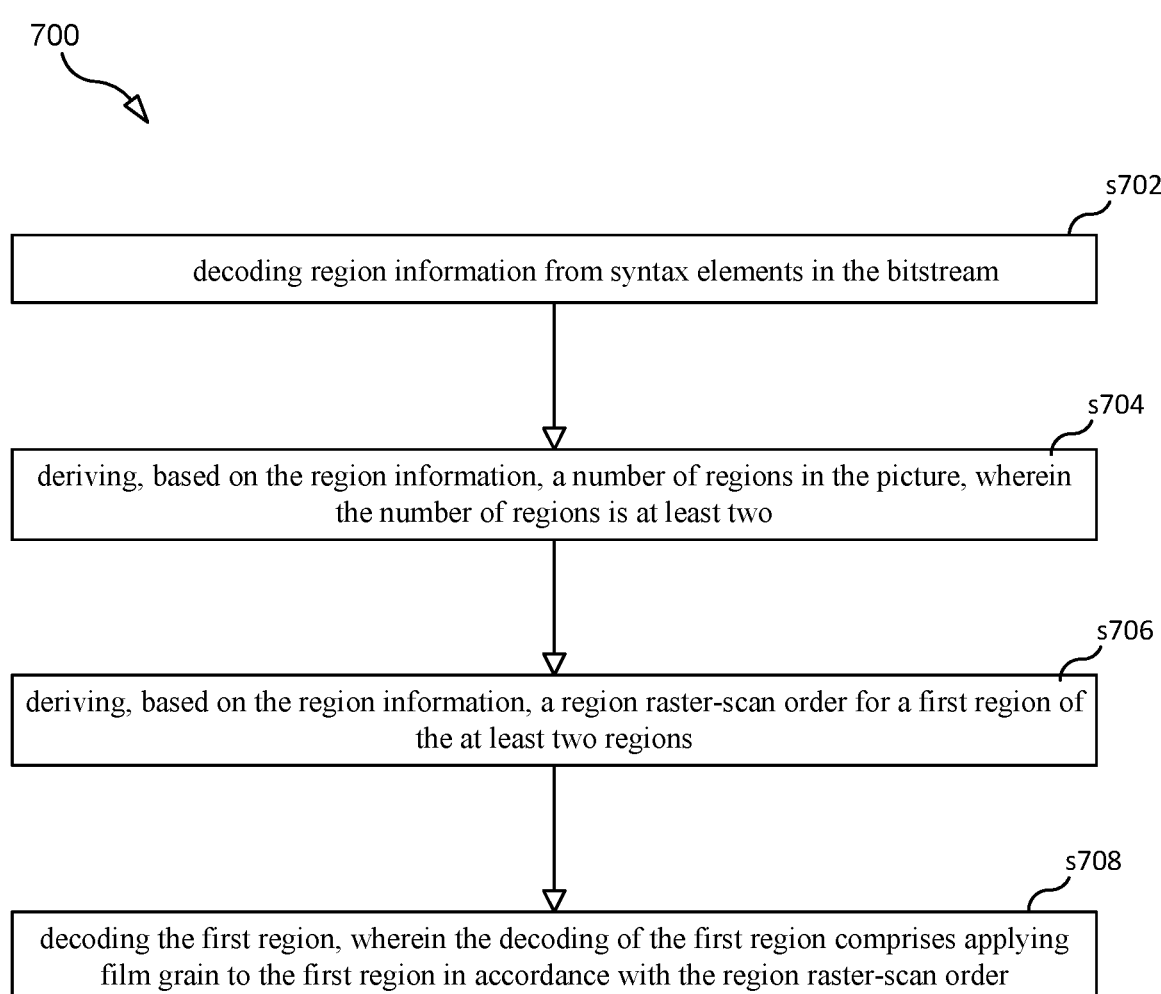

s702 decoding region information from syntax elements in the bitstream s704 deriving, based on the region information, a number of regions in the picture, wherein the number of regions is at least two s706 deriving, based on the region information, a region raster-scan order for a first region of the at least two regions s708 decoding the first region, wherein the decoding of the first region comprises applying film grain to the first region in accordance with the region raster-scan order

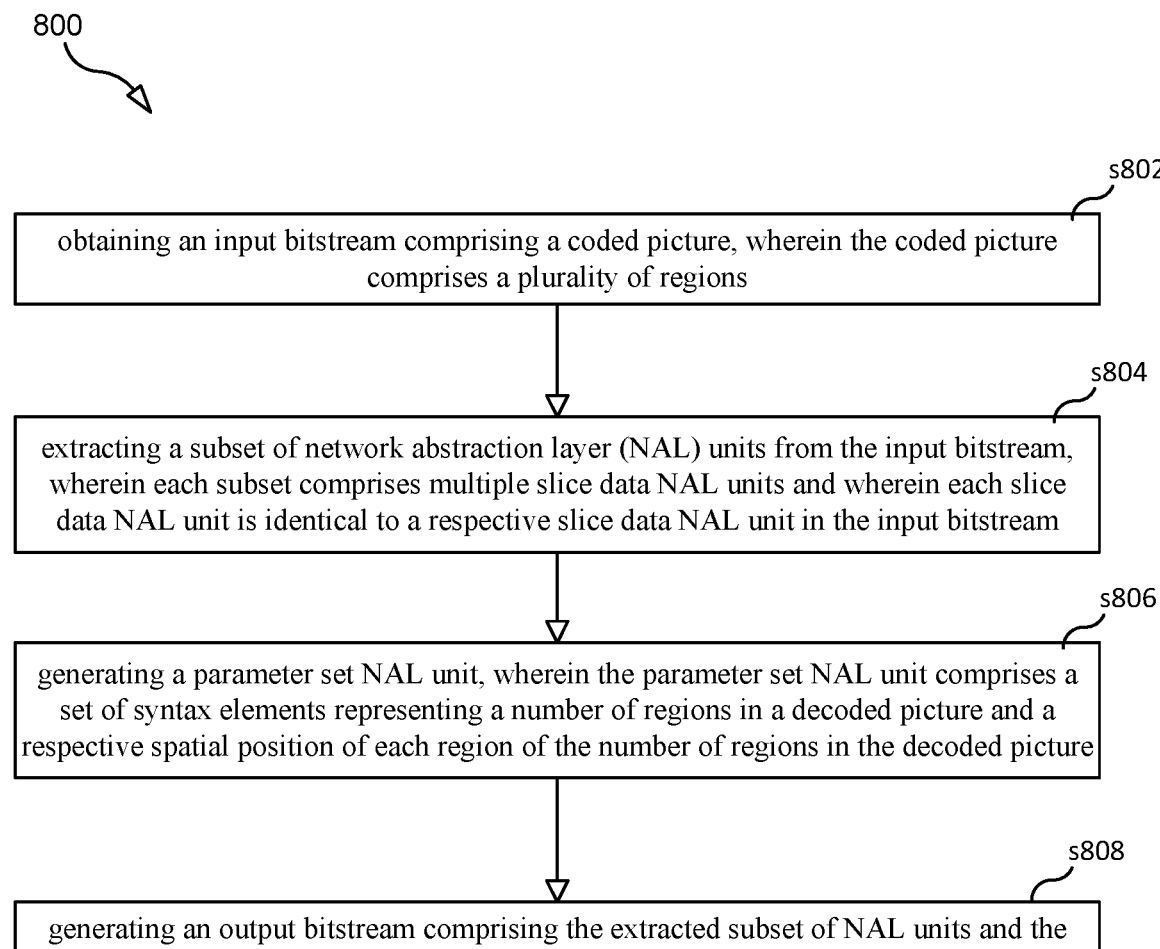

s802 obtaining an input bitstream comprising a coded picture, wherein the coded picture comprises a plurality of regions s804 extracting a subset of network abstraction layer (NAL) units from the input bitstream, wherein each subset comprises multiple slice data NAL units and wherein each slice data NAL unit is identical to a respective slice data NAL unit in the input bitstream s806 generating a parameter set NAL unit, wherein the parameter set NAL unit comprises a set of syntax elements representing a number of regions in a decoded picture and a respective spatial position of each region of the number of regions in the decoded picture s808 generating an output bitstream comprising the extracted subset of NAL units and the generated parameter set NAL unit, wherein both the input bitstream and the output bitstream specify that film grain shall be applied to a picture decoded from the input bitstream and the output bitstream, and wherein the output bitstream is decodable into an output decoded video sequence, wherein decoded sample values of each decoded region of the output decoded video sequence are identical to sample values of a corresponding decoded region from the input stream

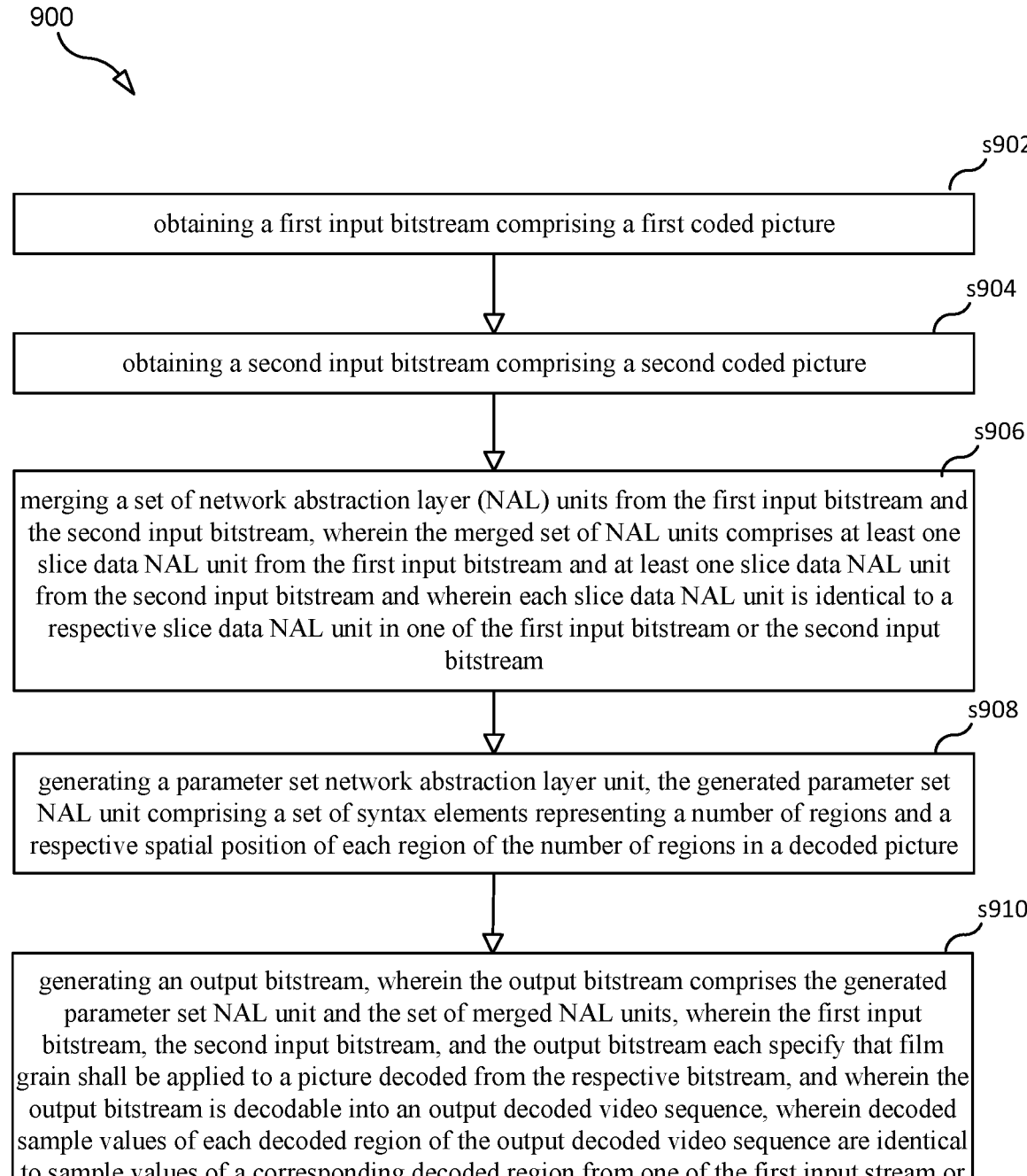

s902 obtaining a first input bitstream comprising a first coded picture s904 obtaining a second input bitstream comprising a second coded picture s906 merging a set of network abstraction layer (NAL) units from the first input bitstream and the second input bitstream, wherein the merged set of NAL units comprises at least one slice data NAL unit from the first input bitstream and at least one slice data NAL unit from the second input bitstream and wherein each slice data NAL unit is identical to a respective slice data NAL unit in one of the first input bitstream or the second input bitstream s908 generating a parameter set network abstraction layer unit, the generated parameter set NAL unit comprising a set of syntax elements representing a number of regions and a respective spatial position of each region of the number of regions in a decoded picture s910 generating an output bitstream, wherein the output bitstream comprises the generated parameter set NAL unit and the set of merged NAL units, wherein the first input bitstream, the second input bitstream, and the output bitstream each specify that film grain shall be applied to a picture decoded from the respective bitstream, and wherein the output bitstream is decodable into an output decoded video sequence, wherein decoded sample values of each decoded region of the output decoded video sequence are identical to sample values of a corresponding decoded region from one of the first input stream or the second input stream

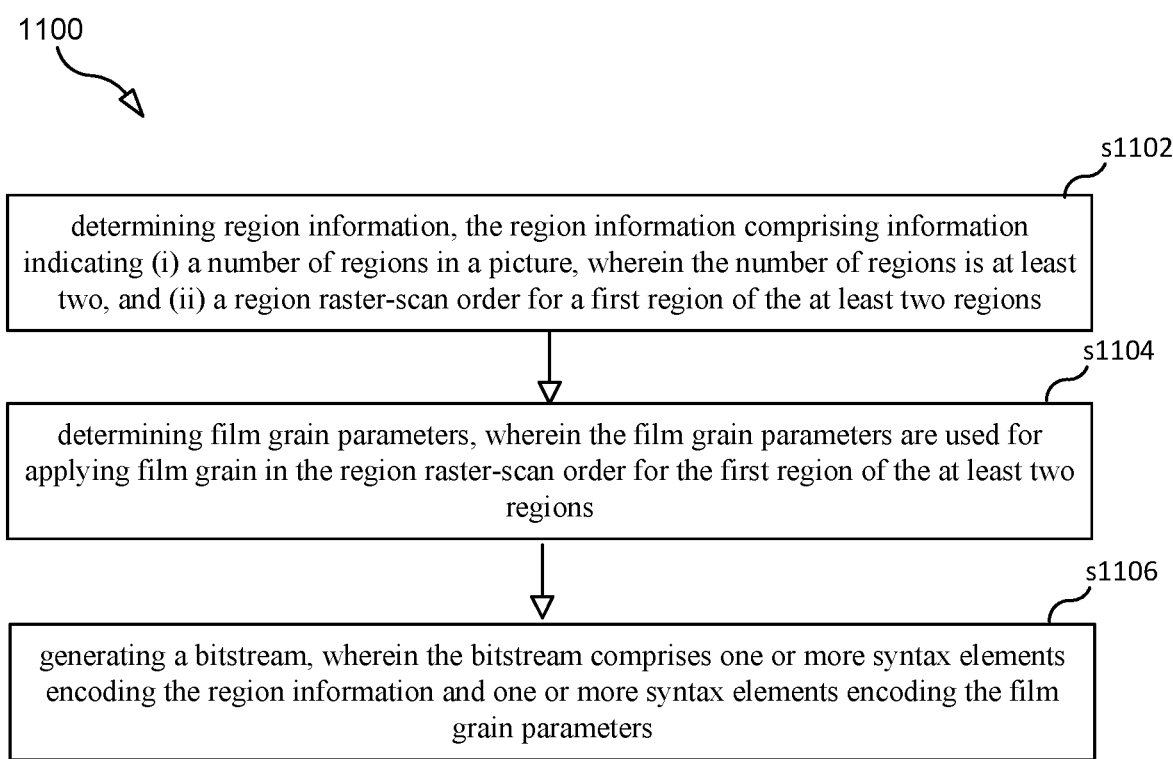

s1102 determining region information, the region information comprising information indicating (i) a number of regions in a picture, wherein the number of regions is at least two, and (ii) a region raster-scan order for a first region of the at least two regions s1104 determining film grain parameters, wherein the film grain parameters are used for applying film grain in the region raster-scan order for the first region of the at least two regions s1106 generating a bitstream, wherein the bitstream comprises one or more syntax elements encoding the region information and one or more syntax elements encoding the film grain parameters

FIG. 11

INDEPENDENT SUBPICTURE FILM GRAIN

CROSS REFERENCE TO RELATED APPLICATION(S)

This application is a 35 U.S.C. § 371 National Stage of International Patent Application No. PCT/EP2022/065841, filed Jun. 10, 2022, claiming benefit from provisional U.S. Patent Application No. 63/216,262, filed Jun. 29, 2021, designating the United States, the disclosures of which are hereby incorporated by reference in their entirety.

TECHNICAL FIELD

Disclosed are embodiments related to independent subpicture film grain.

BACKGROUND

1. HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T are working on the successor to HEVC within the Joint Video Exploratory Team (JVET). The name of this video codec is Versatile Video Coding (VVC) and version 1 of VVC specification, which is the current version of VVC at the time of writing, has been published as Rec. ITU-T H.266|ISO/IEC 23090-3, "Versatile Video Coding", 2020.

2. Components

A video (a.k.a., video sequence) consists of a series of pictures (a.k.a., images) where each picture consists of one or more components. Each component can be described as a two-dimensional rectangular array of sample values. It is common that a picture in a video sequence consists of three components; one luma component Y where the sample values are luma values and two chroma components Cb and Cr, where the sample values are chroma values. It is also common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components.

3. Blocks and Units

A block is one two-dimensional array of samples. In video coding, each component is split into blocks and the coded video bitstream consists of a series of coded blocks. It is common in video coding that the picture is split into units that cover a specific area of the picture. Each unit consists of all blocks from all components that make up that specific area and each block belongs fully to one unit. The macroblock in H.264 and the Coding unit (CU) in HEVC are examples of units.

A block can alternatively be defined as a two-dimensional array that a transform used in coding is applied to. These blocks are known under the name "transform blocks." Alternatively, a block can be defined as a two-dimensional array that a single prediction mode is applied to. These blocks can be called "prediction blocks". In this application, the word block is not tied to one of these definitions but that the descriptions herein can apply to either definition.

4. Residuals, Transforms, and Quantization

A residual block consists of samples that represents sample value differences between sample values of the original source blocks and the prediction blocks. The residual block is processed using a spatial transform. In the encoder, the transform coefficients are quantized according to a quantization parameter (QP) which controls the precision of the quantized coefficients. The quantized coefficients can be referred to as residual coefficients. A high QP value would result in low precision of the coefficients and thus low fidelity of the residual block. A decoder receives the residual coefficients, applies inverse quantization and inverse transform to derive the residual block.

5. NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC begins with a header which specifies the NAL unit type of the NAL unit that identifies what type of data is carried in the NAL unit, the layer ID and the temporal ID for which the NAL unit belongs to. The NAL unit type is transmitted in the nal_unit_type codeword in the NAL unit header and the type indicates and defines how the NAL unit should be parsed and decoded. The rest of the bytes of the NAL unit is payload of the type indicated by the NAL unit type. A bitstream consists of a series of concatenated NAL units.

The syntax for the NAL unit header for HEVC is shown in Table 1.

TABLE 1

| HEVC NAL unit header syntax | |
| --- | --- |
| | Descriptor |
| nal_unit_header( ) { | |
| forbidden_zero_bit | f(1) |
| nal_unit_type | u(6) |
| nuh_layer_id | u(6) |
| nuh_temporal_id_plus1 | u(3) |
| } | |

The syntax for the NAL unit header in the current version of VVC is shown in Table 2.

TABLE 2

| VVC NAL unit header syntax | |
| --- | --- |
| | Descriptor |
| nal_unit_header( ) { | |
| forbidden_zero_bit | f(1) |

TABLE 2-continued

VVC NAL unit header syntax

| | Descriptor |
|---|---|
| nuh_reserved_zero_bit | u(1) |
| nuh_layer_id | u(6) |
| nal_unit_type | u(5) |
| nuh_temporal_id_plus1 | u(3) |
| } | |

The NAL unit types of the current version of VVC are shown in Table 3. The decoding order is the order in which NAL units shall be decoded, which is the same as the order of the NAL units within the bitstream. The decoding order may be different from the output order, which is the order in which decoded pictures are to be output, such as for display, by the decoder.

TABLE 3

NAL unit types in VVC

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | | VCL |
| 8 | IDR_N_LP | slice_layer_rbsp( ) | |
| 9 | CRA_NUT | Coded slice of an IDR picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point inforamtion operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set | non-VCL |
| 18 | SUFFIX_APS_NUT | adaptation_parameter_set_rbsp( ) | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information | non-VCL |
| 24 | SUFFIX_SEI_NUT | sei_rbsp( ) | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

6. Temporal Layers

In HEVC and VVC all pictures are associated with a TemporalId value that specifies the temporal layer to which the picture belongs. TemporalId values are decoded from the nuh_temporal_id_plus1 syntax element in the NAL unit header. The encoder is required to set TemporalId values such that pictures belonging to a lower layer is perfectly decodable when higher temporal layers are discarded. Assume for instance that an encoder has output a bitstream using temporal layers 0, 1 and 2. Then removing all layer 2 NAL units or removing all layer 1 and 2 NAL units will result in bitstreams that can be decoded without problems. This is ensured by restrictions in the HEVC specification with which the encoder must comply. For instance, it is not allowed for a picture of a temporal layer to reference a picture of a higher temporal layer.

7. Layer Id

The value of the nuh_layer_id syntax element in the NAL unit header specifies the layer ID to which the NAL unit belongs. A layer access unit in VVC is defined as a set of one or more NAL units for which the VCL NAL units all have a particular value of nuh_layer_id, that are associated with each other according to a specified classification rule, that are consecutive in decoding order, and that contain exactly one coded picture.

A coded layer video sequence (CLVS) in VVC version 1 is defined as a sequence of layer access units that consists, in decoding order, of a CLVS layer access unit, followed by zero or more layer access units that are not CLVS layer access units, including all subsequent layer access units up to but not including any subsequent layer access unit that is a CLVS layer access unit. The relation between the layer access units and coded layer video sequences is illustrated in FIG. 1A.

In VVC version 1, layers may be coded independently or dependently from each other. When the layers are coded independently, a layer with, for example, nuh_layer_id 0 may not predict video data from another layer with e.g. nuh_layer_id 1. In VVC version 1, dependent coding between layers may be used, which enables support for scalable coding with SNR, spatial and view scalability.

8. Picture Header

VVC includes a picture header, which is a NAL unit having nal_unit_type equal to PH_NUT. The picture header is similar to the slice header, but the values of the syntax elements in the picture header are used to decode all slices of one picture. Each picture in VVC consist of one picture header NAL unit followed by all coded slices of the picture where each coded slice is conveyed in one coded slice NAL unit.

9. Intra Random Access Point (IRAP) Pictures and the Coded Video Sequence (CVS)

For single layer coding in HEVC, an access unit (AU) is the coded representation of a single picture. An AU may consist of several video coding layer (VCL) NAL units as well as non-VCL NAL units.

An Intra Random Access Point (IRAP) picture in HEVC is a picture that does not refer to any pictures other than itself for prediction in its decoding process. The first picture in the bitstream in decoding order in HEVC must be an IRAP picture, but an IRAP picture may additionally also appear later in the bitstream. HEVC specifies three types of IRAP pictures, the broken link access (BLA) picture, the instantaneous decoder refresh (IDR) picture, and the clean random access (CRA) picture.

A coded video sequence (CVS) in HEVC is a series of access units starting at an IRAP access unit up to, but not including the next IRAP access unit in decoding order.

IDR pictures always start a new CVS. An IDR picture may have associated random access decodable leading (RADL) pictures. An IDR picture does not have associated RASL pictures.

BLA pictures also starts a new CVS and has the same effect on the decoding process as an IDR picture. However, a BLA picture in HEVC may contain syntax elements that specify a non-empty set of one or more reference pictures. A BLA picture may have associated RASL pictures, which are not output by the decoder and may not be decodable, as they may contain references to pictures that may not be present in the bitstream. A BLA picture may also have associated RADL pictures, which are decoded.

A CRA picture may have associated RADL or RASL pictures. As with a BLA picture, a CRA picture may contain syntax elements that specify a non-empty set of one or more reference pictures. For CRA pictures, a flag can be set to specify that the associated RASL pictures are not output by the decoder, because they may not be decodable, as they may contain references to pictures that are not present in the bitstream. A CRA may or may not start a CVS.

In VVC, there is also the gradual decoding refresh (GDR) picture which may or may not start a CVS without an Intra picture. A coded layer video sequence start (CLVSS) picture in VVC is an IRAP picture or a GDR picture. A CLVSS picture in VVC may start a VVC coded layer video sequence (CLVS) which is similar to a CVS in HEVC. There is no BLA picture type in VVC.

10. Parameter Sets

HEVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs.

VVC also uses the HEVC parameter set types. In VVC, there is additionally the adaptation parameter set (APS) and the decoding parameter set (DPS). The APS may contain information that can be used for multiple slices and two slices of the same picture can use different APSes. The DPS consist of information specifying the "worst case" in terms of profile and level that the decoder will encounter in the entire bitstream.

11. SEI Messages

Supplementary Enhancement Information (SEI) messages are codepoints in the coded bitstream that do not influence the decoding process of coded pictures from VCL NAL units. SEI messages usually address issues of representation/rendering of the decoded bitstream. The overall concept of SEI messages and many of the messages themselves have been inherited from the H.264 and HEVC specifications into the VVC specification. In VVC, an SEI RBSP contains one or more SEI messages.

SEI message syntax table describing the general structure of an SEI message in VVC is shown in Table 4. The type of each SEI message is identified by its payload type.

TABLE 4

| SEI message syntax in VVC | |
|---|---|
| | Descriptor |
| sei_message( ) { | |
|   payloadType = 0 | |
|   do { | |
|     payload_type_byte | u(8) |
|     payloadType += payload_type_byte | |
|   } while( payload_type_byte = = 0xFF ) | |
|   payloadSize = 0 | |
|   do { | |
|     payload_size_byte | u(8) |
|     payloadSize += payload_size_byte | |
|   } while( payload_size_byte = = 0xFF ) | |
|   sei_payload( payloadType, payloadSize ) | |
| } | |

Annex D in the VVC specification specifies syntax and semantics for SEI message payloads for some SEI messages, and specifies the use of the SEI messages and VUI parameters for which the syntax and semantics are specified in ITU-T H.SEI|ISO/IEC 23002-7. The SEI payload structure in Annex D of VVC version 1 lists the SEI messages supported in VVC version 1. SEI messages assist in processes related to decoding, display or other purposes. However, SEI messages are not required for constructing the luma or chroma samples by the decoding process. Some SEI messages are required for checking bitstream conformance and for output timing decoder conformance. Other SEI messages are not required for checking bitstream conformance. A decoder is not required to support all SEI messages. Usually, if a decoder encounters an unsupported SEI message, it is discarded.

ITU-T H.274|ISO/IEC 23002-7, also referred to as VSEI, specifies the syntax and semantics of SEI messages and is particularly intended for use with coded video bitstreams, although it is written in a manner intended to be sufficiently generic that it may also be used with other types of coded video bitstreams. The first version of ITU-T H.274|ISO/IEC 23002-7 was finalized in July 2020. At the time of writing, version 2 is under development. JVET-U2006-v1 is the current draft for version 2 that specifies additional SEI messages for use with coded video bitstreams.

The persistence of an SEI message indicates the pictures to which the values signalled in the instance of the SEI message may apply. The part of the bitstream that the values of the SEI message may apply to are referred to as the persistence scope of the SEI message.

12. Slices and Subpictures

The concept of slices in HEVC divides the picture into independently coded slices, where decoding of one slice in a picture is independent of other slices of the same picture. Different coding types could be used for slices of the same picture, i.e. a slice could either be an I-slice, P-slice or B-slice. One purpose of slices is to enable resynchronization in case of data loss. In HEVC, a slice is a set of one or more CTUs.

In the current version of VVC, a slice is defined as an integer number of complete tiles or an integer number of consecutive complete CTU rows within a tile of a picture that are exclusively contained in a single NAL unit. A picture may be partitioned into either raster scan slices or rectangular slices. A raster scan slice consists of a number of complete tiles in raster scan order. A rectangular slice consists of a group of tiles that together occupy a rectangular region in the picture or a consecutive number of CTU rows inside one tile. Each slice has a slice header comprising syntax elements. Decoded slice header values from these syntax elements are used when decoding the slice. Each slice is carried in one VCL NAL unit.

During the development of the VVC specification, slices have been referred to as tile groups. Subpictures are supported in the current version of VVC where a subpicture is defined as a rectangular region of one or more slices within a picture. This means a subpicture contains one or more slices that collectively cover a rectangular region of a picture.

In VVC, the location and size of each subpicture is signaled in the SPS. This is done by a first codeword, sps_num_subpics_minus1, that specifies how many subpictures there are. Then there is a loop that for each subpicture index i specifies the location and size for a subpicture. This loop associates each subpicture to its subpicture index value i. The SPS also specifies for each subpicture whether its boundaries shall be treated as picture boundaries or not for the motion compensation and/or in-loop filtering processes.

In the VVC slice header, there is one subpicture ID syntax element and one slice address syntax element. The subpicture ID specifies the subpicture ID of the subpicture and the slice address specifies the slice address within the subpicture. All slices that belong to the same subpicture must have the same subpicture ID value. In order to support bitstream extraction and merge operations without a need to rewrite slice headers, there is a mapping mechanism in VVC between subpicture ID values and subpicture index values. This mapping is signalled by either the sps_subpic_id[i] or the pps_subpic_id[i] syntax elements in the SPS and PPS, respectively. For example, a sps_subpic_id[1] value equal to 3 means that subpicture ID value 3 is mapped to the subpicture index value 1. By using this mapping mechanism, only SPS or PPS syntax elements needs to be rewritten during a bitstream extraction or merge operation.

13. Tiles

The current version of VVC includes a tool called tiles that divides a picture into rectangular spatially independent regions. Tiles in the VVC coding standard are similar to the tiles used in HEVC. Using tiles, a picture in VVC can be partitioned into rows and columns of CTUs where a tile is an intersection of a row and a column. FIG. 1B shows an example of a tile partitioning using 4 tile rows and 5 tile columns resulting in a total of 20 tiles for the picture.

The tile structure is signalled in the picture parameter set (PPS) by specifying the heights of the rows and the widths of the columns. Individual rows and columns can have different sizes, but the partitioning always spans across the entire picture, from left to right and top to bottom respectively.

There is no decoding dependency between tiles of the same picture. This includes intra prediction, context selection for entropy coding and motion vector prediction. One exception is that in-loop filtering dependencies are generally allowed between tiles.

In the rectangular slice mode in VVC, a tile can further be split into multiple slices where each slice consists of a consecutive number of CTU rows inside one tile. FIG. 1C shows an example of tile partitioning and FIG. 1D shows an example of a rectangular slice partitioning using the tile partitioning of FIG. 1C.

14. Bitstream Extraction and Merge Operations

Some video applications involve operations made on bitstreams, including bitstream extraction and bitstream merge operations. A bitstream extraction operation takes an input bitstream as input and produces an output bitstream, where the output bitstream represents a subset of the video content of the input bitstream. A bitstream merge operation takes multiple input bitstreams as input and produces a single output bitstream, where the output bitstream represents the union of the video content of the input bitstreams. For bitstream merge to work, it is very common that the input bitstreams are created with merge support in mind. Bitstream merge operations where the bitstreams are encoded fully independent by e.g. different encoders is typically not possible.

It is desirable that the bitstream format supports bitstream extraction and merge operations without requiring low-level bitstream changes, since low-level bitstream changes infer substantial implementation burden and increased computational complexity. One common design goal is to enable these operations without any need to manipulate coded slice data. For example, in VVC it would be acceptable to re-write parameter set data but not acceptable to re-write slice data or picture header data.

For extraction and merge to work, the video format needs to support spatial partitioning of the content into independently coded segments. Slices, tiles and subpictures are examples of such segments. In HEVC, motion-constrained tile sets (MCTSs) are typically used, where slices containing one or more complete tiles are encoded such that the slices are independent. Special care is taken into the HEVC motion compensation processes, where the HEVC encoder needs to select motion parameters carefully so that the slices become independent, hence the name MCTS. In VVC, the subpicture partitioning type was introduced, for which support of less complex bitstream extraction and merge handling was a key reason. Compared to HEVC MCTSs, VVC subpictures are more compression efficient and do not require special care related to motion compensation.

Bitstream extraction and merge operations for subpictures in VVC could for instance comprise extracting one or more subpictures from a first bitstream, extracting one or more subpictures from a second bitstream and merging the extracted subpictures into a new third bitstream.

15. Picture Order Count (POC)

Pictures in HEVC are identified by their picture order count (POC) values, also known as full POC values. Each slice contains a code word, pic_order_cnt_lsb, that shall be the same for all slices in a picture. pic_order_cnt_lsb is also known as the least significant bits (lsb) of the full POC since it is a fixed-length code word and only the least significant bits of the full POC is signalled. Both encoder and decoder keep track of POC and assign POC values to each picture that is encoded/decoded. The pic_order_cnt_lsb can be signalled by 4-16 bits. There is a variable MaxPicOrderCntLsb used in HEVC which is set to the maximum pic_order_cnt_lsb value plus 1. This means that if 8 bits are used to signal pic_order_cnt_lsb, the maximum value is 255 and MaxPicOrderCntLsb is set to $2^8=256$. The picture order count value of a picture is called PicOrderCntVal in HEVC. Usually, PicOrderCntVal for the current picture is simply called PicOrderCntVal.

16. Output Processes

FIG. 1E shows an output process in a decoding system. The input to the video decoder, the bitstream, is decoded by a decoding engine in a decoding process to one or more decoded pictures. The decoded picture is finally subject to an output process and output.

The input to the output process is the decoded picture and the output of the output process is the output picture. The decoded picture that is used as input to the output process may be stored in the decoded picture buffer and may be used in the decoding process of other, future pictures. The output picture may not be identical to the decoded picture. In this case, the output picture may be stored as a separate picture in memory. The output process may output an output picture that is a modified version of the decoded picture in a number of different ways, such as one of the following or a combination of two or more of the following:

1. Apply film grain
2. Apply a color transform and/or color component value scaling
3. Apply a projection mapping or inverse projection mapping such as converting the decoded picture from a cube map projection to a spherical representation or to an equirectangular representation.
4. Perform a region-wise packing or region-wise unpacking of the picture by a set of one or more region-wise operations such as repositioning, scaling and rotation
5. Crop the decoded picture
6. Convert the decoded picture to a different color format such as from Rec 709 to PQ
7. Convert the decoded picture to a different chroma format such as from YUV 4:2:0 to YUV 4:4:4
8. Scale or resample the picture from a decoded resolution to an output resolution
9. Convert to a different sample aspect ratio
10. Convert two decoded fields to an interlaced picture
11. Apply/remove frame packing
12. Extracting one or more subpictures (similar to cropping the decoded picture but may for instance comprise merging subpictures from different locations in the picture.

17. Adding Noise or Film Grain after Decoding Pictures

Noise in video originates from different sources. This noise can be suppressed by the encoder at the earliest stage of the process. When the picture is reconstructed at the decoder before display, modelled or unmodelled noise can be added to the decoded picture. Different objectives have been introduced that manifests the subjective quality increase by adding noise which, as a result of increase in picture resolution, has now become more apparent. The first reason to add noise might be to introduce artistic effects, e.g. while shooting documentaries, portraits, black and white scenes, to capture reality, or to get the "real cinema effect" for movies. The second reason is to hide coding artifacts such as blurriness, blocking, and banding effects appeared due to the heavy encoding procedure in the encoder.

18. Film Grain

Film grain characteristics SEI message in VVC

A film grain process is supported in VVC. This process is essentially identical to the film grain processes specified in the H.264/AVC and HEVC video coding standards. The process includes an SEI message that carries a parametrized model for film grain synthesis in the decoder. The film grain characteristic SEI message includes a cancel flag, film_grain_characteristics_cancel_flag, which enables the film grain process if it is set equal to 0. Also, when the flag is set to 0, film grain parameter syntax elements follow the flag. At last, film_grain_characteristics_persistence_flag specifies the persistence of the film grain characteristic SEI message for the current layer. In Table 5 below, a simplified version of the syntax is shown.

TABLE 5

| Film grain characteristics SEI message syntax in VVC | |
| --- | --- |
| | Type |
| film_grain_characteristics(payloadSize) { | |
| film_grain_characteristics_cancel_flag | u(1) |
| if ( !film_grain_characteristics_cancel_flag ) { | |
| film_grain_mode_id | u(2) |
| separate_colour_description_present_flag | u(1) |
| if (separate_colour_description_present_flag) { | |
| color_specific_parameters( ) | |
| } | |
| more_film_grain_parameters( ) | |
| film_grain_characteristics_persistence_flag | u(1) |
| } | |

Film Grain in SMPTE RDD 5 (2006)

In the Film Grain Technology—specification introduced in [SPMTE], a seed derivation method is specified that derives a seed value to be used for the Film grain characteristics SEI process. The seed is initialized using information that is already available at the decoder and is selected from a predetermined set of one or more 256 possible seeds in a look-up table. For the pseudo-random number generator, and to select 8×8 blocks of samples, the seed is initialized as: seed=Seed_LUT[Mod[pic_offset+color_offset[c], 256]], in which color_offset[c] is equal to 0, 85, and 170 for Y, Cb and Cr channels respectively and pic_offset is defined as: pic_offset=POC(curr_pic)+(POC_offset<<5), where POC (curr_pic) is equal to the picture order count value of the current frame; and POC_offset is set equal to the value of idr_pic_id on IDR frames, otherwise it is set equal to 0. Moreover, the pseudo-random number generator for creation of 64×64 sample blocks is initialized as follows: seed=Seed_LUT[h+v*13], where h and v represent a value for horizontal and vertical directions respectively. Both h and v are in the range of [0,12] and determine which pattern of the film grain database is used as source of film grain samples. Finally, in either cases, the output of Seed_LUT[.] is used as the seed for the pseudo-random number generator.

Film Grain in AV1

The AV1 video codec format supports film grain generation. The film grain is applied when a picture is output. The sequence_header_obu( ) contains a film_grain_params_present flag that is an enable flag for the film grain signalling and process. The film grain parameters are signalled last in the frame_header_obu( ) in a syntax table called film_grain_params( ) which is shown in Table 6 below.

TABLE 6

Film grain parameters syntax in AV1

| | Type |
|---|---|
| film_grain_params( ) { | |
|   if ( !film_grain_params_present ‖ (!show_frame && !showable_frame) ) { | |
|     reset_grain_params( ) | |
|     Return | |
|   } | |
|   apply_grain | f(1) |
|   if ( !apply_grain ) { | |
|     reset_grain_params( ) | |
|     Return | |
|   } | |
|   grain_seed | f(16) |
|   if ( frame_type == INTER_FRAME ) | |
|     update_grain | f(1) |
|   Else | |
|     update_grain = 1 | |
|   if ( !update_grain ) { | |
|     film_grain_params_ref_idx | f(3) |
|     tempGrainSeed = grain_seed | |
|     load_grain_params( film_grain_params_ref_idx ) | |
|     grain_seed = tempGrainSeed | |
|     Return | |
|   } | |
|   more_film_grain_parameters( ) | |
| } | |

In film_grain_params( ) first there is a flag, apply_grain, that controls whether film grain shall be applied to the current picture or not. Then there is a 16-bit grain_seed syntax element that is used as a seed for a pseudo-random number generator that generates the grains. The update_grain flag specifies whether film grain parameter values from a reference picture should be used, or if the film grain parameter values to use shall be decoded from the frame header. The reference picture to use is identified by the film_grain_params_ref_idx syntax element value. In Table 6, the frame header film grain parameters are represented by the more_film_grain_parameters( ) row to simplify the table. The value of grain_seed initializes the seed for the pseudo-random number generator used for the Luma component of the white noise grain. For chroma components Cb and Cr, the value is modified via XOR operation as follows: Cb_seed=grain_seed^0xb524 and Cr_seed=grain_seed^0x49d8.

19. Normative Film Grain

In JVET contribution JVET-Q0424-v2, it was proposed to add normative film grain generation to VVC, within conformance, which means that the bitstream specifies that film grain shall be applied, every decoder must apply film grain to decoded pictures before output and that all decoders shall do so such that the sample values of the output pictures with film grain applied are identical regardless of the implementation. In other words, for every given bitstream with film grain there is a certain output of sample values, and any decoder that outputs any sample value that differ to the corresponding sample value of the certain output would be anon-conforming VVC decoder. In JVET-Q0424-v2, there is a film grain seed syntax element in the picture header that together with the POC value of the picture is used to initialize a pseudo-random number generator used to generate the film grain.

20. Scalable Nesting SEI Message

The scalable nesting SEI message in VVC provides a mechanism to associate SEI messages with specific OLSs, specific layers, or specific sets of subpictures. A scalable nesting SEI message contains one or more SEI messages. The SEI messages contained in the scalable nesting SEI message are also referred to as the scalable-nested SEI messages. The scalable nesting SEI message syntax in VVC is shown in Table 7.

TABLE 7

Scalable nesting SEI message syntax in VVC

| | Descriptor |
|---|---|
| scalable_nesting( payloadSize ) { | |
|   sn_ols_flag | u(1) |
|   sn_subpic_flag | u(1) |
|   if( sn_ols_flag ) { | |
|     sn_num_olss_minus1 | ue(v) |
|     for( i = 0; i <= sn_num_olss_minus1; i++ ) | |
|       sn_ols_idx_delta_minus1[ i ] | ue(v) |
|   } else { | |
|     sn_all_layers_flag | u(1) |
|     if( !sn_all_layers_flag ) { | |
|       sn_num_layers_minus1 | ue(v) |
|       for( i = 1; i <= sn_num_layers_minus1; i++ ) | |
|         sn_layer_id[ i ] | u(6) |
|     } | |
|   } | |
|   if( sn_subpic_flag ) { | |
|     sn_num_subpics_minus1 | ue(v) |
|     sn_subpic_id_len_minus1 | ue(v) |
|     for( i = 0; i <= sn_num_subpics_minus1; i++ ) | |
|       sn_subpic_id[ i ] | u(v) |
|   } | |
|   sn_num_seis_minus1 | ue(v) |
|   while( !byte_aligned( ) ) | |
|     sn_zero_bit /* equal to 0 */ | u(1) |
|   for( i = 0; i <= sn_num_seis_minus1; i++ ) | |
|     sei_message( ) | |
| } | |

A similar scalable nesting SEI message also exists in HEVC. The HEVC scalable nesting SEI message is providing a mechanism to associate SEI messages with bitstream subsets corresponding to various operation points or with specific layers or sub-layers. The subpicture concept does not exist in HEVC and so the nesting SEI message in HEVC could not be used to associate SEI messages with specific sets of subpictures in contrast to VVC nesting SEI message. The scalable nesting SEI message syntax in HEVC is shown in Table 8. In VVC, the film grain characteristic SEI message can be combined with the scalable nesting SEI message to associate film grain generation with a subpicture, but there is no description how the film grain generation shall be done, that is left open for the implementer.

TABLE 8

| Scalable nesting SEI message syntax in HEVC | |
|---|---|
| | Descriptor |
| scalable_nesting( payloadSize ) { | |
|   bitstream_subset_flag | u(1) |
|   nesting_op_flag | u(1) |
|   if( nesting_op_flag ) { | |
|     default_op_flag | u(1) |
|     nesting_num_ops_minus1 | ue(v) |
|     for( i = default_op_flag; i <= nesting_num_ops_minus1; i++ ) { | |
|       nesting_max_temporal_id_plus1[ i ] | u(3) |
|       nesting_op_idx[ i ] | ue(v) |
|     } | |
|   } else { | |
|     all_layers_flag | u(1) |
|     if( !all_layers_flag ) { | |
|       nesting_no_op_max_temporal_id_plus1 | u(3) |
|       nesting_num_layers_minus1 | ue(v) |
|       for( i = 0; i <= nesting_num_layers_minus1; i++ ) | |
|         nesting_layer_id[ i ] | u(6) |
|     } | |
|   } | |
|   while( !byte_aligned( ) ) | |
|     nesting_zero_bit /* equal to 0 */ | u(1) |
|   do | |
|     sei_message( ) | |
|   while( more_rbsp_data( ) ) | |
| } | |

SUMMARY

Certain challenges presently exist. For instance, it may be desirable to use a normative film grain process as proposed in JVET-Q0424-v2 for at least two reasons. First, it may be desirable for the encoder to know that film grain will be applied by the decoder, which is not guaranteed in a pure SEI-based film grain solution. Second, it may be desirable for the encoder to know exactly what output the decoder would produce and for the encoder to have full control of the picture quality. Since the support for the SEI-based film grain solution is not guaranteed to be implemented on the decoder side, a content/service provider may decide not risking using the film grain SEI message and instead encode the noise of the source video with a significant penalty on the compression efficiency and/or the video quality.

A problem with the existing solutions is that the combination of normative film grain and subpictures is not supported. In all of H.264, HEVC, VVC, AV1, and JVET-Q0424-v2, the film grain process is a picture-based process that is applied to an entire picture. For VVC, the film grain characteristic SEI message can be associated with subpictures but no details on a decoder process is provided. SMPTE RDD 5-2006 contains only a pure picture based process.

One problem with a straightforward approach to apply film grain to subpictures is that the output sample values of one subpicture may depend on the location of the subpicture in the full picture. There are two reasons for this. The first is that the initialization of the pseudo-random number generator may be done once for the picture. This means that the state of the pseudo-random number generator when the generation crosses a subpicture boundary for a subpicture depends on previous subpictures. The second reason is that the generation of film grain is done in a raster scan order for the full picture and not in a raster scan order within each subpicture.

The embodiments herein propose a region-based film grain generation method for video where the film grain generation for each region S is done as if the region S is a complete separate picture. This is achieved by i) applying the film grain in a raster-scan order within each region rather than in raster scan order within the entire picture, ii) initializing a pseudo-random number generator used for generating film grain for each region, iii) using a region ID value to generate a different seed value for each region to be used to initialize the pseudo-random number generator, iv) suppress film grain deblocking across region edges, and/or v) introducing a mode to switch between independent and dependent film grain generation for regions.

Accordingly, in one aspect there is provided a method for applying film grain to a picture decoded from a bitstream. In one embodiment the method includes decoding region information from syntax elements in the bitstream. The method also includes deriving, based on the region information, a number of regions in the picture, wherein the number of regions is at least two. The method also includes deriving, based on the region information, a region raster-scan order for a first region of the at least two regions. The method also includes decoding the first region, wherein the decoding of the first region comprises applying film grain to the first region in accordance with the region raster-scan order.

In another aspect, there is provided a method for extracting a bitstream. In one embodiment, the method includes obtaining an input bitstream comprising a coded picture, wherein the coded picture comprises a plurality of regions. The method includes extracting a subset of network abstraction layer (NAL) units from the input bitstream, wherein each subset comprises multiple slice data NAL units and wherein each slice data NAL unit is identical to a respective slice data NAL unit in the input bitstream. The method includes generating a parameter set NAL unit, wherein the parameter set NAL unit comprises a set of syntax elements representing a number of regions in a decoded picture and a respective spatial position of each region of the number of regions in the decoded picture. The method includes generating an output bitstream comprising the extracted subset of NAL units and the generated parameter set NAL unit, wherein both the input bitstream and the output bitstream specify that film grain shall be applied to a picture decoded from the input bitstream and the output bitstream, and wherein the output bitstream is decodable into an output decoded video sequence, wherein decoded sample values of each decoded region of the output decoded video sequence are identical to sample values of a corresponding decoded region from the input stream.

In yet another aspect, there is provided a method for merging a bitstream. In one embodiment, the method includes obtaining a first input bitstream comprising a first coded picture. The method includes obtaining a second input bitstream comprising a second coded picture. The method includes merging a set of network abstraction layer (NAL) units from the first input bitstream and the second input bitstream, wherein the merged set of NAL units comprises at least one slice data NAL unit from the first input bitstream and at least one slice data NAL unit from the second input bitstream and wherein each slice data NAL unit is identical to a respective slice data NAL unit in one of the first input bitstream or the second input bitstream. The method includes generating a parameter set network abstraction layer unit, the generated parameter set NAL unit comprising a set of syntax elements representing a number of regions and a respective spatial position of each region of the number of regions in a decoded picture. The method includes generating an output bitstream, wherein the output bitstream comprises the generated parameter set NAL unit and the set of merged NAL units, wherein the first input bitstream, the second input bitstream, and the output bitstream each specify that film grain shall be applied to a picture decoded from the respective bitstream, and wherein the output bitstream is decodable into an output decoded video sequence, wherein decoded sample values of each decoded region of the output decoded video sequence are identical to sample values of a corresponding decoded region from one of the first input stream or the second input stream.

In another aspect, there is provided a method performed by an encoder. In one embodiment, the method includes determining region information, the region information comprising information indicating (i) a number of regions in a picture, wherein the number of regions is at least two, and (ii) a region raster-scan order for a first region of the at least two regions. The method includes determining film grain parameters, wherein the film grain parameters are used for applying film grain in the region raster-scan order for the first region of the at least two regions. The method includes generating a bitstream, wherein the bitstream comprises one or more syntax elements encoding the region information and one or more syntax elements encoding the film grain parameters.

In another aspect there is provided a computer program comprising instructions which when executed by processing circuitry of an apparatus causes the apparatus to perform any of the methods disclosed herein. In one embodiment, there is provided a carrier containing the computer program wherein the carrier is one of an electronic signal, an optical signal, a radio signal, and a computer readable storage medium. In another aspect there is provided an apparatus that is configured to perform the methods disclosed herein. The apparatus may include memory and processing circuitry coupled to the memory An advantage of the embodiments disclosed herein is that they enable a specified decoder output when film grain is applied to regions, regardless of any bitstream extraction or bitstream merge operation applied before decoding. Another advantage is that individual seed values are generated for each region, which means that, for example, two neighboring regions in the same picture will not get identical film grain applied to them. Another advantage is that an encoder is provided with the flexibility to choose whether the decoder shall apply film grain for the picture as a whole or separately and independently for each region in the picture. Applying film grain for the picture as a whole may be preferred if the film grain is such that region boundaries would be visible if film grain is applied separately for each region. Applying film grain separately may be preferred if that is not the case and bitstream extraction or merge operations are expected.

BRIEF DESCRIPTION OF THE DRAWINGS

The accompanying drawings, which are incorporated herein and form part of the specification, illustrate various embodiments.

FIG. 2 illustrates a system according to an embodiment.

FIG. 5 illustrates a system according to an embodiment.

FIG. 7 is a flowchart illustrating a process according to an embodiment.

FIG. 8 is a flowchart illustrating a process according to an embodiment.

FIG. 9 is a flowchart illustrating a process according to an embodiment

FIG. 11 is a flowchart illustrating a process according to an embodiment.

DETAILED DESCRIPTION

This application claims the benefit of U.S. Provisional Application No. 63/216,262 filed on Jun. 29, 2021, the entire contents of which are hereby incorporated by reference.

FIG. 2 illustrates a system 200 according to an example embodiment. System 200 includes an encoder 202 in communication with a decoder 204 via a network 210 (e.g., the Internet or other network).

Figure 1A:
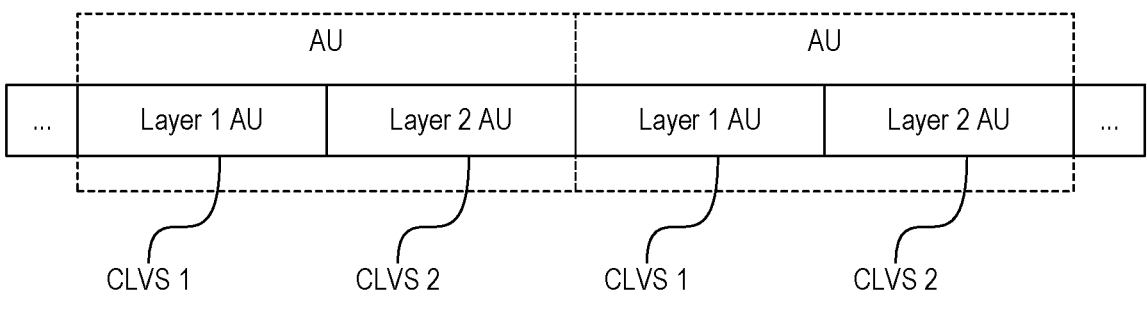
FIG. 1A illustrates the relation between layer access units and coded layer video sequences.
Figure 1B:
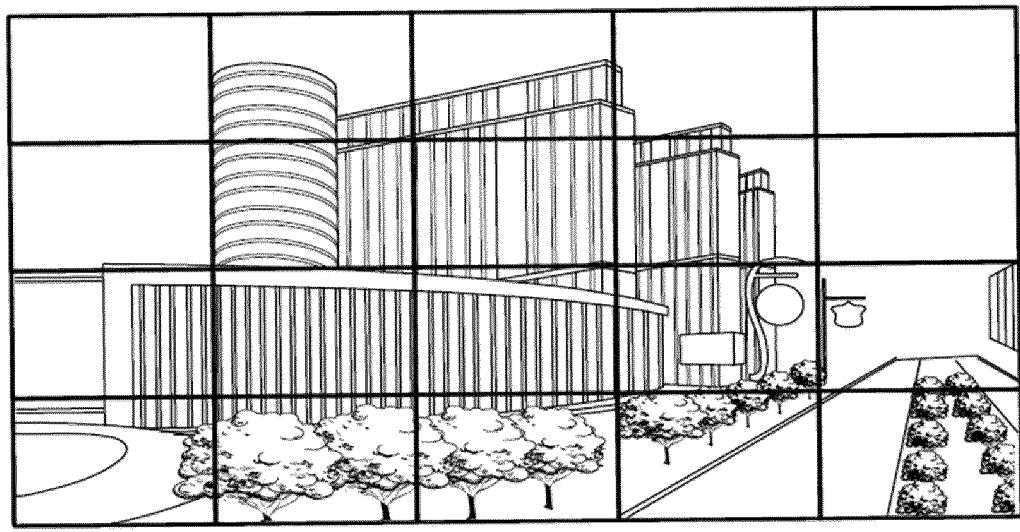
FIG. 1B shows an example of a tile partitioning.
Figure 1C:
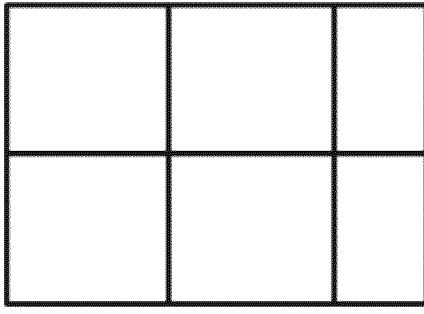
FIG. 1C shows another example of a tile partitioning.
Figure 1D:
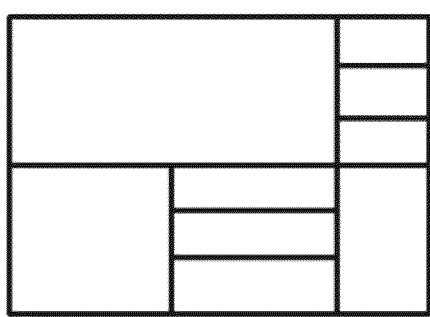
FIG. 1D shows an example of rectangular slice partitioning.
Figure 1E:
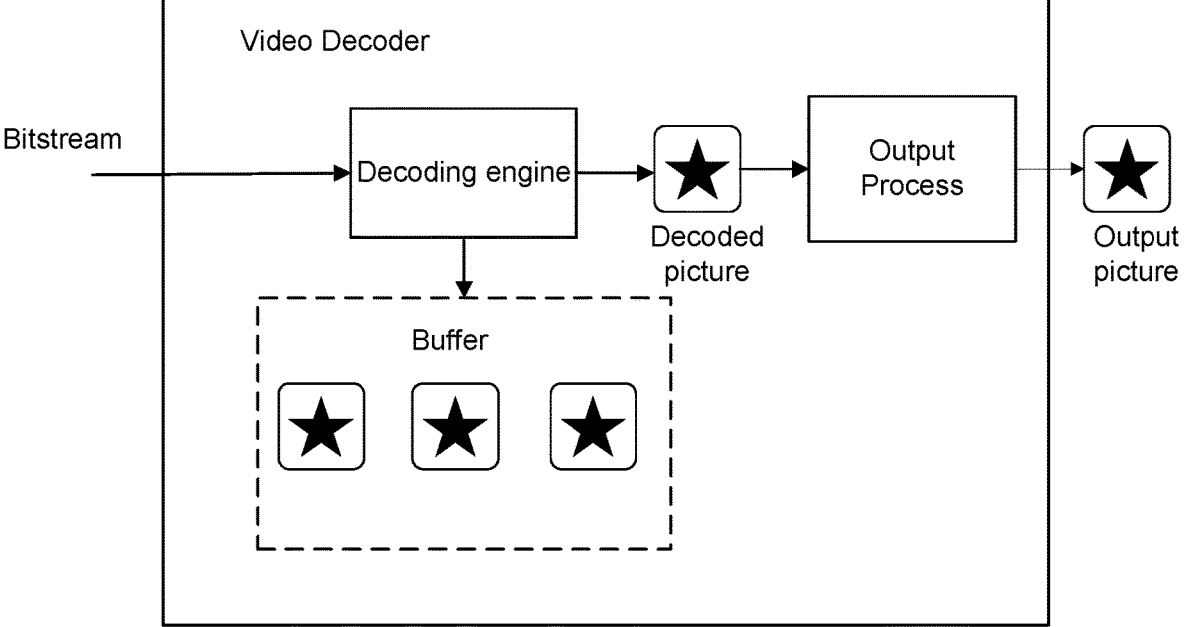
FIG. 1E shows an output process.
Figure 3:
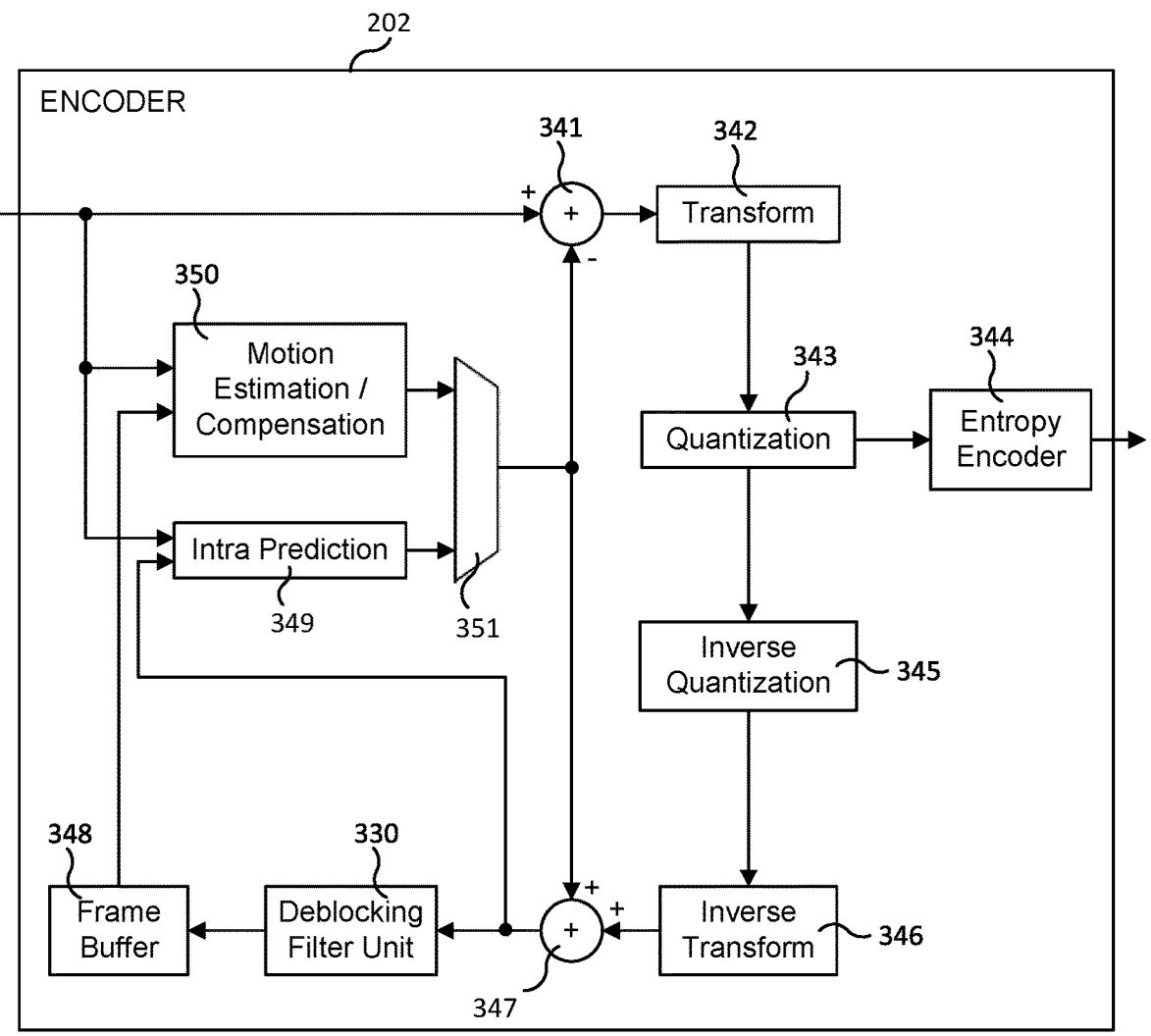
FIG. 3 is a schematic block diagram of an encoder according to an embodiment.

FIG. 3 is a schematic block diagram of encoder 202 for encoding a block of pixel values (hereafter "block") in a video frame (picture) of a video sequence according to an embodiment. A current block is predicted by performing a motion estimation by a motion estimator 350 from an already provided block in the same frame or in a previous frame. The result of the motion estimation is a motion or displacement vector associated with the reference block, in the case of inter prediction. The motion vector is utilized by a motion compensator 350 for outputting an inter prediction of the block. An intra predictor 349 computes an intra prediction of the current block. The outputs from the motion estimator/compensator 350 and the intra predictor 349 are input in a selector 351 that either selects intra prediction or inter prediction for the current block. The output from the selector 351 is input to an error calculator in the form of an adder 341 that also receives the pixel values of the current block. The adder 341 calculates and outputs a residual error as the difference in pixel values between the block and its prediction. The error is transformed in a transformer 342, such as by a discrete cosine transform, and quantized by a quantizer 343 followed by coding in an encoder 344, such as by entropy encoder. In inter coding, also the estimated motion vector is brought to the encoder 344 for generating the coded representation of the current block. The transformed and quantized residual error for the current block is also provided to an inverse quantizer 345 and inverse transformer 346 to retrieve the original residual error. This error is added by an adder 347 to the block prediction output from the motion compensator 350 or the intra predictor 349 to create a reference block that can be used in the prediction and coding of a next block. This new reference block is first processed by a deblocking filter unit 330 according to the embodiments in order to perform deblocking filtering to combat any blocking artifact. The processed new reference block is then temporarily stored in a frame buffer 348, where it is available to the intra predictor 349 and the motion estimator/compensator 350.

Figure 4:
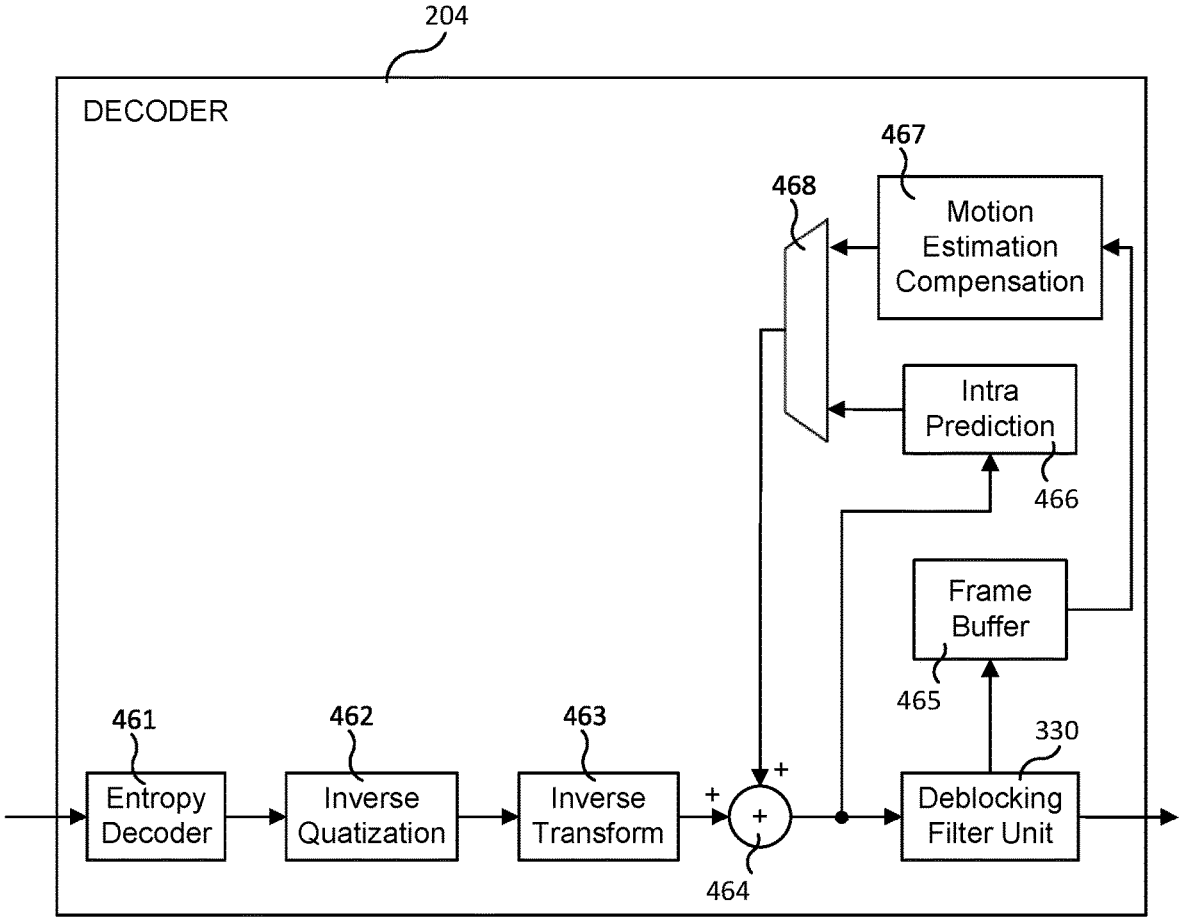
FIG. 4 is a schematic block diagram of a decoder according to an embodiment.

FIG. 4 is a corresponding schematic block diagram of decoder 404 according to some embodiments. The decoder 404 comprises a decoder 461, such as entropy decoder, for decoding an encoded representation of a block to get a set of one or more quantized and transformed residual errors. These residual errors are dequantized in an inverse quantizer 462 and inverse transformed by an inverse transformer 463 to get a set of one or more residual errors. These residual errors are added in an adder 464 to the pixel values of a reference block. The reference block is determined by a motion estimator/compensator 467 or intra predictor 466, depending on whether inter or intra prediction is performed. A selector 468 is thereby interconnected to the adder 464 and the motion estimator/compensator 467 and the intra predictor 466. The resulting decoded block output form the adder 464 is input to a deblocking filter unit 330 according to the embodiments in order to deblocking filter any blocking artifacts. The filtered block is output form the decoder 404 and is furthermore preferably temporarily provided to a frame buffer 465 and can be used as a reference block for a subsequent block to be decoded. The frame buffer 465 is thereby connected to the motion estimator/compensator 467 to make the stored blocks of pixels available to the motion estimator/compensator 467. The output from the adder 464 is preferably also input to the intra predictor 466 to be used as an unfiltered reference block.

FIG. 5 illustrates a user equipment (UE) 500 according to an embodiment. As shown in FIG. 5, UE 500 includes decoder 204, which receives a bitstream (e.g., a bitstream generated by encoder 202) and, based on the information in the bitstream, generates decoded pictures. UE 500 also includes a picture processor 502 which may process one or more of the decoded pictures using parameters provided by decoder 204 to produce processed pictures, which may be displayed on a display 504 of UE 500 (e.g., picture process 502 may perform an overlay process). While picture processor 502 is illustrated in FIG. 5 as being separate from decoder 204, this is not a requirement as in some embodiments picture processor 502 may be a component of decoder 204. Picture processor 502 may produce a processed picture that is a modified version of a decoded picture in a number of different ways, such as one of the following or a combination of two or more of the following:

1. Apply film grain
2. Apply a color transform and/or color component value scaling
3. Apply a projection mapping or inverse projection mapping such as converting the decoded picture from a cube map projection to a spherical representation or to an equirectangular representation.
4. Perform a region-wise packing or region-wise unpacking of the picture by a set of one or more region-wise operations such as repositioning, scaling and rotation
5. Crop the decoded picture
6. Convert the decoded picture to a different color format such as from Rec 709 to PQ
7. Convert the decoded picture to a different chroma format such as from YUV 4:2:0 to YUV 4:4:4
8. Scale or resample the picture from a decoded resolution to an output resolution
9. Convert to a different sample aspect ratio
10. Convert two decoded fields to an interlaced picture
11. Apply/remove frame packing
12. Extracting one or more subpictures (similar to cropping the decoded picture but may for instance comprise merging subpictures from different locations in the picture.

In the description below, various embodiments are described that solve one or more of the above described problems. It is to be understood by a person skilled in the art that two or more embodiments, or parts of embodiments, may be combined to form new embodiments which are still covered by this disclosure.

A region may be defined as a coded part of a picture that is independent of other coded parts of a picture. This means that each part can be parsed or decoded without any information from any other parts of the picture. For instance, the entropy decoding of coded data for one region can be done without any need to decode the coded data of any other region. Also, derivation of certain values used in the decoding process of a coded region is done without the need of values belonging to other regions. Examples of such certain values include source sample values, decoded sample values, motion vector values, intra mode values, block mode values and more.

In some embodiments, a region may correspond to a slice in VVC. Alternatively, a region may correspond to a VVC subpicture where a subpicture consists of one or more complete rectangular slices. Each slice may include a subpicture ID, where the subpicture ID has the same value for all slices in a subpicture, as described earlier. A region may be rectangular but it does not have to be. It is to be understood by a person skilled in the art that a region may also correspond to a slice, a subpicture or a similar concept of a coded part of a picture in a future video codec standard beyond VVC.

Figures 6A, 6B:
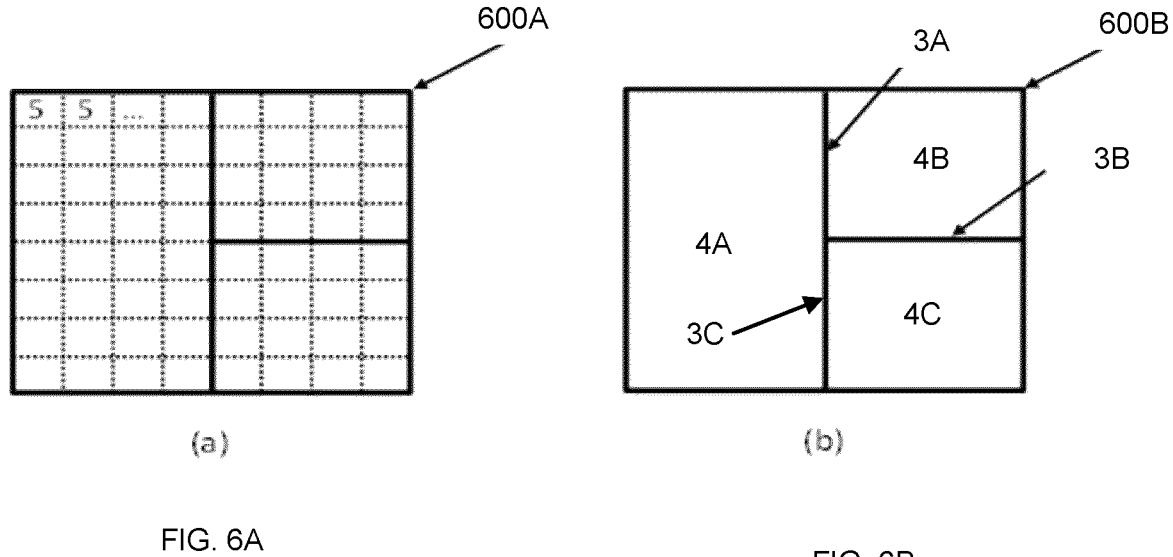
FIG. 6A illustrates a picture that is partitioned into three regions.
FIG. 6B illustrates a picture that is partitioned into three regions.

FIGS. 6A and 6B illustrate a picture that is partitioned into three regions. FIG. 6A illustrates a current picture 600A consisting of a plurality of blocks (5). In VVC, the blocks (5) correspond to CTUs. FIG. 6B illustrates the same current picture 600B having three region boundaries (3A-3C) that partition the picture 600B into three regions (4A-4C).

Currently film grain is applied to the entire picture 600A, 600B. Embodiments disclosed herein apply film grain separately for each region (4A-C). A method for decoding, generating, and applying film grain to a current picture may consist of a subset or all of the following steps.

(1) The decoder (204) decodes region information (4) from a set of syntax elements in the bitstream, from which the decoder derives the number of regions and their spatial position in the decoded current picture, and where the number of regions is at least two.

(2) The decoder decodes a first region of the at least two regions, wherein the decoding of the first region comprises applying film grain to the first region treating the first region as a complete picture.

(3) The decoder decodes a second region of the at least two regions, wherein the decoding of the second region comprises applying film grain to the second region treating the second region as a complete picture.

(4) The decoder outputs the decoded current picture.

As an alternative, a method for decoding, generating, and applying film grain to a current picture may consist of a subset or all of the following steps.

(1) The decoder (204) decodes region information (4) from a set of syntax elements in the bitstream, from which the decoder derives the number of regions and their spatial position in the decoded current picture, and where the number of regions is at least two.

(2) The decoder decodes a first region of the at least two regions, wherein the decoding of the first region comprises applying film grain to the first region treating the first region as a complete picture, wherein the first region does not include the top-left CTU of the picture.

(3) The decoder outputs the decoded current picture.

The region may in the embodiments herein be one of a subpicture or slice.

Treating a Region as a Complete Picture

Details on treating a region as a complete picture are described herein. Treating a region as a complete picture means that film grain is applied to each region as if the region was a complete picture.

In one embodiment, film grain is applied in a raster-scan order within each region rather than in a raster-scan order for the entire picture. Such raster-scan order within each region may be referred to as region raster scan order. For example, in FIG. 6B, one raster-scan order may be to apply film grain to region 4A, then to region 4B, then to region 4C. Different or alternative orders of applying film grain to each region may be contemplated.

The film grain generation process may include generating one or more seed values to use for initializing a pseudo-random number generator used in the film grain generation process. Treating a region as a complete picture may include generating a seed value to use in the film grain generation process for each region rather than generating a seed value for the entire picture. In one version of the embodiment a unique seed value is generated for each region.

In some embodiments, film grain is generated in two dimensional blocks. One existing example of this is the SMPTE RDD 5-2006 specification in which film grain is generated in blocks of 8×8 samples. In such block embodiments, the film grain may be applied in region raster scan order of blocks having the same size as the two-dimensional blocks used when generating the film grain. In one non-limiting example, block size may have the size 8×8.

Figure 6C:
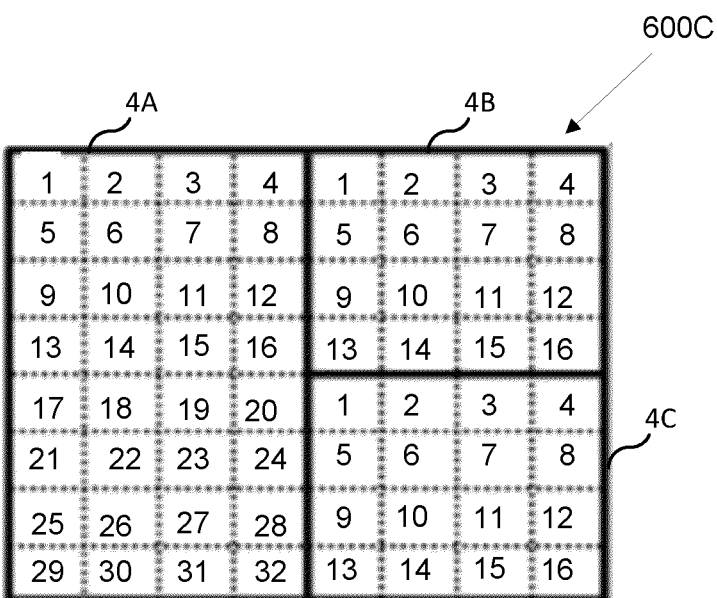
FIG. 6C illustrates a region raster-scan order of blocks for a picture that is partitioned into three regions according to an embodiment.

FIG. 6C illustrates a region raster-scan order of blocks for a picture that is partitioned into three regions according to an embodiment. Film grain may be applied to blocks in region 4A in order as indicated by numbers 1-32. Film grain may be applied to blocks in region 4B in an order as indicated by numbers 1-16. Film grain may be applied to blocks in region 4C as indicated by numbers 1-16. The raster-scan orders shown in FIG. 6C are illustrative, and other or alternative orders per regions 4A-4C may be utilized. The raster-scan order of blocks may be referred to as a block-based raster-scan order.

Additionally, film grain generation may include applying a film grain deblocking filter on the block boundaries. As used herein, a block boundary (or boundary) may also be referred to as a block edge (or edge). For example, in the SMPTE RDD 5-2006 specification, deblocking of vertical block edges between adjacent 8×8 blocks is applied, as well as deblocking of horizontal 8×8 block edges. In such an environment, treating a region as a complete picture in one embodiment means that film grain deblocking of block edges is applied only to block edges within one region and not applied to block edges that also are region edges. For example, with reference to FIGS. 6A-6C, in one embodiment, film grain deblocking may not be applied to block edges that are also region edges such as edges 3A, 3B, and 3C in FIG. 6B.

To summarize, treating a region as a complete picture comprises one or more of the following:

applying film grain in a raster-scan order within each region of the picture;

applying film grain in a block-based raster-scan order within each region of the picture;

applying film grain in a block-based raster-scan order within each region of the picture and raster scan order within each block;

the film grain generation may comprise generating seed values to use for initializing a pseudo-random number generator used in the film grain generation process for each region of the picture, wherein the generated seed value for any region differ to a generated seed value of any other region in the picture;

applying block-based film grain that includes determining whether two neighboring blocks belong to the same region, and in response to determining that the two neighboring blocks belong to the same region, applying a film grain deblocking filter to the block edge between the neighboring block.

In some embodiments, a method for decoding, generating and applying film grain to a current picture may consist of a subset or all of the following steps:

(1) The decoder decodes region information from a set of syntax elements in the bitstream, from which the decoder derives the number of regions and their spatial position in the decoded current picture, and where the number of regions is at least two.

(2) The decoder generates a seed value A for a first region of the at least two regions.

(3) The decoder decodes the first region of the at least two regions, wherein the decoding of the first region comprises applying film grain to the first region using seed value A treating the first region as a complete picture.

(4) The decoder generates a seed value B for a second region of the at least two regions.

(5) The decoder decodes the second region of the at least two regions, wherein the decoding of the second region comprises applying film grain to the second region using seed value B treating the second region as a complete picture, wherein A and B have different values.

(6) The decoder outputs the decoded current picture.

In one version of this embodiment, the film grain generation comprises generating a seed value to use for initializing a pseudo-random number generator used in the film grain generation process for each region of the picture, and individual seed values are not generated for each region in the picture as previously described. Instead, only one seed value A is generated for the picture, and the seed value A is used for each region. Compared the previous solution in this embodiment, this solution will result in a film grain pattern that may be repeated for each region in the picture, but using a single seed value A for all regions in the picture is less complicated that deriving different values for each region, especially if the picture contains many regions.

In both the alternative to use one seed value for all regions in the picture, and the alternative to use different seed values for each region in the picture, the pseudo-random number generator is initialized for each region. Compared to the state-of-the-art film grain generation solutions, both alternatives will result in a deterministic output for each region regardless of any bitstream extraction or merge operations.

In this embodiment, a method for decoding, generating and applying film grain to a current picture may consist of a subset or all of the following steps:

(1) The decoder decodes region information from a set of syntax elements in the bitstream, from which the decoder derives the number of regions and their spatial position in the decoded current picture, and where the number of regions is at least two.

(2) The decoder generates a seed value A for the current picture.

(3) The decoder decodes a first region of the at least two regions, wherein the decoding of the first region comprises applying film grain to the first region using seed value A treating the first region as a complete picture.

(4) The decoder decodes a second region of the at least two regions, wherein the decoding of the second region comprises applying film grain to the second region using seed value A treating the second region as a complete picture.

(5) The decoder outputs the decoded current picture.

Mode Signaling

In some embodiments, signalling is introduced in the form of one or more new syntax elements in the bitstream for an encoder to specify to a decoder to either apply the film grain generation on the entire decoded picture as a whole, or apply the film grain generation treating each region as a complete picture. Here, decoding the one or more new syntax elements may result in the decoder determining a mode value as equal to a first value, and then generate film grain for each region as if each region is a complete separate picture. If the decoding of the one or more new syntax elements results in the decoder determining a mode value as equal to a second value, different to the first value, the decoder generates film grain for the entire picture as if as if the picture consisted of one single region.

Variant Using a Single Mode Value for the Entire Picture

In this embodiment, a method for decoding, generating and applying film grain to a current picture may consist of a subset or all of the following steps:

(1) The decoder decodes region information from a set of syntax elements in the bitstream, from which the decoder derives the number of regions and their spatial position in the decoded current picture, and where the number of regions is at least two.

(2) The decoder derives a mode value from one or more syntax elements in the bitstream, wherein the mode value may be equal to at least a first or a second value.

(3) The decoder decodes the current picture wherein the decoding comprises at least one of the following a. If the mode value is derived to be equal to the first value, the decoder applies film grain in a raster-scan order within each region of the picture. If the mode value is derived to be equal to the second value, the decoder applies film grain in a raster scan order of the entire picture.

b. If the mode value is derived to be equal to the first value, the decoder applies film grain in a block-based raster-scan order within each region of the picture. If the mode value is derived to be equal to the second value, the decoder applies film grain in a block-based raster scan order of the entire picture.

c. If the mode value is derived to be equal to the first value, the decoder generates seed values to use in the film grain generation process for each region of the picture, wherein the generated seed value for any region differ to a generated seed value of any other region in the picture. If the mode value is derived to be equal to the second value, the decoder generates a single seed value A to use in the film grain generation process for the entire picture. In one variant, the single seed value A is used to initialize the film grain generation process once for the picture. In another variant, the pseudo-random number generator used in the film grain generation process is initialized for each region, wherein the single seed value A is used for all initializations.

d. If the mode value is derived to be equal to the first value, the following is done: (i) The decoder determines whether any two neighboring blocks belong to the same region; (ii) In response to determining that the two neighboring blocks belong to the same region, the decoder applies a film grain deblocking filter to the block edge between the neighboring blocks; (iii) In response to determining that the two neighboring blocks do not belong to the same region, the decoder does not apply any film grain deblocking filter to the block edge between the neighboring blocks. Optionally: if the mode value is derived to be equal to the second value, the decoder applies a film grain deblocking filter to all block edges between neighboring blocks in the picture regardless of whether a block edge is also a region edge or not.

(4) The decoder outputs the decoded current picture.

Variant Using a Mode Value for Each Region to Control Film Grain Deblocking

Figure 6D:
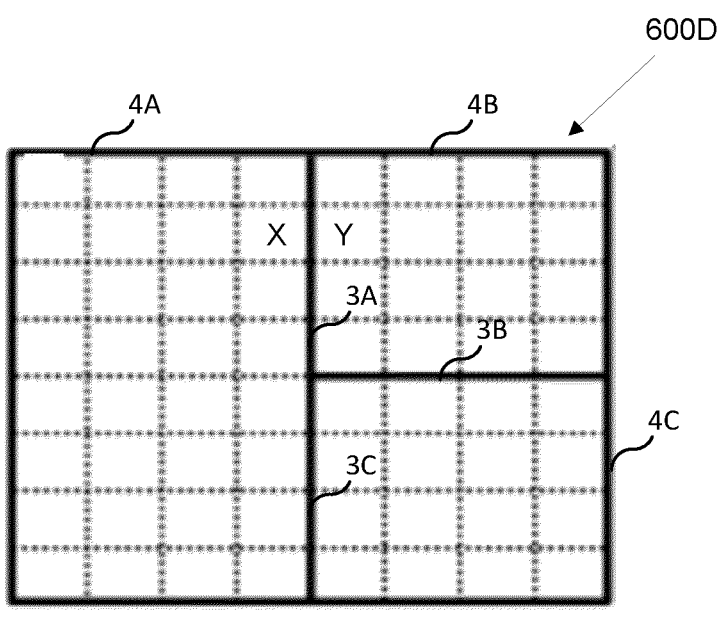
FIG. 6D illustrates a film grain generation mode for a picture that is partitioned into three regions according to an embodiment.

FIG. 6D is illustrates a film grain generation mode for a picture that is partitioned into three regions according to an embodiment. As shown in FIG. 6D, picture 600D has three regions (4A, 4B, and 4C) and is divided into blocks. Region edge 3A borders region 4B, region edge 3B borders region 4B and 4C, and region edge 3C borders region 4A and 4C. Block X in region 4A shares a common edge with block Y in region 4B.

In an alternative embodiment, a method for decoding, generating and applying film grain to a current picture may consist of a subset or all of the following steps:

(1) The decoder decodes region information from a set of syntax elements in the bitstream, from which the decoder derives the number of regions and their spatial position in the decoded current picture, and where the number of regions is at least two.

(2) The decoder derives a mode value for each region in the picture from one or more syntax elements in the bitstream, wherein each mode value may be equal to at least a first or a second value. For example, region 4A of picture 600D in FIG. 6D may have a respective first region mode value and region 4B may have a second region mode value. This mode value may be referred to as a "region mode value."

(3) The decoder applies a film grain deblocking filter to all block edges between neighboring blocks that both belong to the same region. With reference to FIG. 600D, the decoder applies a film grain deblocking filter to the left, top, and bottom edges of block X and to the top, right, and bottom edges of block Y.

(4) For each block edge E where the two neighboring blocks belong to different regions R1 and R2, the decoder determines whether the mode value of both regions R1 and R2 is equal to the second value. If that is the case, the decoder applies a film grain deblocking filter to the block edge E. If that is not the case, the decoder does not apply any film grain deblocking to the block edge E. For example, with reference to FIG. 600D, if the region mode value of region 4A is the second value and the region mode value of region 4B is also the second value, then the decoder applies a film grain deblocking filter to the common block edge on blocks X and Y (edge 3A). If the region modes have other values, the decoder does not apply a film grain deblocking filter to the edge 3A.

(5) The decoder outputs the decoded current picture.

In an alternative embodiment, a method for decoding, generating and applying film grain to a current picture may consist of a subset or all of the following steps:

(1) The decoder decodes region information from a set of syntax elements in the bitstream, from which the decoder derives the number of regions and their spatial position in the decoded current picture, and where the number of regions is at least two.

(2) The decoder derives a mode value for each region in the picture from one or more syntax elements in the bitstream, wherein each mode value may be equal to at least a first or a second value.

(3) The decoder applies a film grain deblocking filter to all block edges between neighboring blocks that both belong to the same region.

(4) For each block edge E where the two neighboring blocks belong to different regions R1 and R2, the decoder applies a film grain deblocking filter to the block edge E such that only sample values that belong to a region for which the mode value is equal to the second value are modified. For example, with reference to FIG. 600D, if the region mode value of region 4A is the first value and the region mode value of region 4B is the second value, then the decoder applies a film grain deblocking filter to the common block edge on blocks X and Y (edge 3A) such that only samples values in block Y are modified by the filtering.

(5) The decoder outputs the decoded current picture.

Seed Value Generation

In this embodiment, a novel method for deriving a seed value for a pseudo-random number generator used in the film grain generation process is provided. The method introduces deriving the seed value based on a region ID value that is decoded from the bitstream for the coded region S. The region ID value may preferably be derived from decoding syntax elements representing region ID values from one of a parameter set, such as an SPS or PPS, a picture header, or a slice header.

In this embodiment, a method for decoding, generating and applying film grain to a current picture from a bitstream may consist of a subset or all of the following steps:

(1) The decoder decodes region information from a set of syntax elements in the bitstream, from which the decoder derives the number of regions and their spatial position in the decoded current picture, and where the number of regions is at least two.

(2) The decoder derives, from syntax element values in the bitstream, a region ID value R1 for a first region of the at least two regions, and generates a seed value A for the first region based on the region ID value R1.

(3) The decoder decodes the first region of the at least two regions, wherein the decoding of the first region comprises applying film grain to the first region using seed value A.

(4) The decoder derives, from syntax element values in the bitstream, a region ID value R2 for a second region of the at least two regions, and generates a seed value B for the second region based on the region ID value R2.

(5) The decoder decodes the second region of the at least two regions, wherein the decoding of the second region comprises applying film grain to the second region using seed value B.

(6) The decoder outputs the decoded current picture.

If the region ID value is derived from a parameter set, deriving a region ID for a region may comprise using a loop over the number of regions, decode a region ID syntax element in the parameter set for each region in that loop and derive the region ID for a region as equal to the value of the corresponding region ID syntax element in the parameter set.

If the region ID value is derived from a picture header, deriving a region ID for a region may comprise using a loop over the number of regions, decode a region ID syntax element in the picture header for each region in that loop and derive the region ID for a region as equal to the value of the corresponding region ID syntax element in the picture header.

If the region ID value is derived from the slice header, deriving a region ID for a region may comprise decoding the region ID from a syntax element in the slice header. In other words, deriving the region ID as equal to the value of one or more syntax elements in the slice header that represents the region ID. In one variant the coded data for a region comprises two or more coded slices. In this case, each slice header of the two or more coded slices contains syntax elements representing the same region ID value and the region ID value for the region is derived from any of the slice headers.

In one embodiment, the region ID is a subpicture ID. Using the method on top of VVC subpictures would include deriving a film grain seed value for a subpicture based on what in the VVC specification is called the "subpicture ID" value for the subpicture. In VVC, the subpicture ID value may be signalled by any of the following syntax elements: sh_subpic_id in the slice header, pps_subpic_id[i] in the PPS or sps_subpic_id[i] in the SPS. The subpicture ID values for all subpictures can be derived from SPS and PPS data alone, either by decoding the pps_subpic_id[i] or sps_subpic_id[i] syntax elements, or when none of these are present by deriving the subpicture ID value for each subpicture as equal to the subpicture index value of the subpicture.

It may be preferable in a VVC scenario to derive the region ID values from parameter set syntax elements alone and not by decoding the region ID from a slice syntax element as follows:

```
for( i = 0; i <= sps_num_subpics_minus1; i++ )
    if( sps_subpic_id_mapping_explicitly_signalled_flag )
        SubpicIdVal[ i ] = pps_subpic_id_mapping_present_flag ?
pps_subpic_id[ i ] : sps_subpic_id[ i ]
    else
        SubpicIdVal[ i ] = i
```

In the derivation above sps_num_subpics_minus1 represent the number of subpictures in the picture, i represent a subpicture index, sps_subpic_id_mapping_explicitly_signalled_flag is a flag specifying whether subpicture index mapping is invoked, SubpicIdVal[i] is the subpicture ID of subpicture i, pps_subpic_id_mapping_present_flag is a flag specifying whether subpicture index mapping syntax is present in the SPS or in the PPS, pps_subpic_id[i] is a syntax element in the PPS that is specifies the subpicture ID of the subpicture having subpicture index equal to i, and sps_subpic_id[i] is a syntax element in the SPS that is specifies the subpicture ID of the subpicture having subpicture index equal to i.

The decoder in this VVC-like scenario may derive the region ID for the i-th region in the picture as equal to SubpicIdVal[i] and thereby derive the seed value for the i-th region as a function of SubpicIdVal[i]: $seed[i]=f(SubpicIdVal[i])$.

In one embodiment the region ID value is combined with the POC value for the picture containing the region to form a seed value that is used for the region by the decoder to decode the picture. In this embodiment, the seed value to use for the i-th region may be derived as follows: $seed[i]=f(SubpicIdVal[i], PicOrderCntVal)$, where PicOrderCntVal is the POC value of the current picture containing the region.

Bitstream Extraction or Merge Operations

In this embodiment, methods for bitstream extraction and merge operations are described. In the current art, the film grain process is picture-based which, as previously discussed, means that the film grain process introduces dependencies between video segments such as HEVC MCTSs and VVC subpictures. The previously described embodiments provide novel solutions that remove these dependencies and thereby make the segments fully independent when film grain is applied. This enables bit-exact bitstream extraction and bitstream merge operations.

In this embodiment, a method for video bitstream extraction is introduced, comprising:

Extracting a proper subset of NAL units from an input bitstream and generating an output bitstream comprising the proper subset of NAL units and at least one generated parameter set NAL unit wherein:

a. The input bitstream consist of coded pictures where each picture consists of at least two coded regions and the output bitstream contains a proper subset of the coded regions in the input bitstream.

b. The proper subset of NAL units consist of multiple slice data NAL units.

c. Each slice data NAL unit in the proper subset of NAL units is identical to one slice data NAL unit in the input bitstream.

d. At least one parameter set NAL unit is generated and included in the output bitstream.

e. The generated parameter set NAL unit contains a set of syntax elements representing a number of regions and their spatial position in a decoded picture wherein each region is represented in both the input and output bitstream.

f. Both the output bitstream and the input bitstream specifies that film grain shall be applied to each picture that may be decoded from the respective bitstream.

g. The output bitstream is decodable by a decoder into an output decoded video sequence, wherein the decoded sample values of each decoded region of the output decoded video sequence are identical to the sample values of a corresponding decoded region that can be decoded from the input bitstream.

Additionally, in this embodiment, a method for video bitstream merging is introduced, comprising:

Merging a set of NAL units from at least a first input bitstream and a second input bitstream to generate an output bitstream comprising all NAL units in the set of NAL units and at least one generated parameter set NAL unit wherein:

a. The first input bitstream consist of coded pictures and the second input bitstream consists of coded pictures.

b. The set of NAL units consists of at least one slice data NAL unit from the first input bitstream and at least one slice data NAL unit from the second input bitstream.

c. Each slice data NAL unit in the output bitstream is identical to one slice data NAL unit in either the first or second input bitstream.

d. At least one parameter set NAL unit is generated and included in the output bitstream.

e. The generated parameter set NAL unit contains a set of syntax elements representing a number of regions and their spatial position in a decoded picture where each region is represented in the output bitstream and exactly one of the first or second input bitstream.

f. The first input bitstream, the second input bitstream, and the output bitstream all specify that film grain shall be applied to each picture that may be decoded from the respective bitstream.

g. The output bitstream is decodable by a decoder into an output decoded video sequence, wherein the decoded sample values of each decoded region of the output decoded video sequence are identical to the sample values of a corresponding region that can be decoded from exactly one of the first input bitstream or the second input bitstream FIG. 7 is a flowchart illustrating a process 700, according to an embodiment, for applying film grain to a picture decoded from a bitstream. An apparatus 1000, described below, may perform some or all of the steps of process 700. Process 700 may begin in step s702. Step s702 comprises decoding region information from syntax elements in the bitstream. Step s704 comprises deriving, based on the region information, a number of regions in the picture, wherein the number of regions is at least two. Step s706 comprises, deriving, based on the region information, a region raster-scan order for a first region of the at least two regions. Step s708 comprises decoding the first region, wherein the decoding of the first region comprises applying film grain to the first region in accordance with the region raster-scan order.

FIG. 8 is a flowchart illustrating a process 800, according to an embodiment, for extracting a bitstream. An apparatus 1000, described below may perform some or all of the steps of process 800. Process 800 may begin in step s802. Step s802 comprises obtaining an input bitstream comprising a coded picture, wherein the coded picture comprises a plurality of regions. Step s804 comprises extracting a subset of network abstraction layer (NAL) units from the input bitstream, wherein each subset comprises multiple slice data NAL units and wherein each slice data NAL unit is identical to a respective slice data NAL unit in the input bitstream. Step s806 comprises generating a parameter set NAL unit, wherein the parameter set NAL unit comprises a set of syntax elements representing a number of regions in a decoded picture and a respective spatial position of each region of the number of regions in the decoded picture. Step s808 comprises generating an output bitstream comprising the extracted subset of NAL units and the generated parameter set NAL unit. In some embodiments, both the input bitstream and the output bitstream specify that film grain shall be applied to a picture decoded from the input bitstream and the output bitstream. In some embodiments, the output bitstream is decodable into an output decoded video sequence, wherein decoded sample values of each decoded region of the output decoded video sequence are identical to sample values of a corresponding decoded region from the input stream.

FIG. 9 is a flowchart illustrating a process 900, according to an embodiment, for merging a bitstream. An apparatus 1000, described below, may perform some or all of the steps of process 900. Process 900 may begin in step s902. Step s902 comprises obtaining a first input bitstream comprising a first coded picture. Step s904 comprises obtaining a second input bitstream comprising a second coded picture. Step s906 comprises merging a set of network abstraction layer (NAL) units from the first input bitstream and the second input bitstream, wherein the merged set of NAL units comprises at least one slice data NAL unit from the first input bitstream and at least one slice data NAL unit from the second input bitstream and wherein each slice data NAL unit is identical to a respective slice data NAL unit in one of the first input bitstream or the second input bitstream. Step s908 comprises generating a parameter set network abstraction layer unit, the generated parameter set NAL unit comprising a set of syntax elements representing a number of regions and a respective spatial position of each region of the number of regions in a decoded picture. Step s910 comprises generating an output bitstream, wherein the output bitstream comprises the generated parameter set NAL unit and the set of merged NAL units. In some embodiments, the first input bitstream, the second input bitstream, and the output bitstream each specify that film grain shall be applied to a picture decoded from the respective bitstream. In some embodiments, the output bitstream is decodable into an output decoded video sequence, wherein decoded sample values of each decoded region of the output decoded video sequence are identical to sample values of a corresponding decoded region from one of the first input stream or the second input stream.

FIG. 11 is a flowchart illustrating a process according to an embodiment. An apparatus 1000, described below, may perform some or all of the steps of process 1100. Process 1100 may begin in step s1102. Step s1102 comprises determining region information, the region information comprising information indicating (i) a number of regions in a picture, wherein the number of regions is at least two, and (ii) a region raster-scan order for a first region of the at least two regions. Step s1104 comprises determining film grain parameters, wherein the film grain parameters are used for applying film grain in the region raster-scan order for the first region of the at least two regions. Step s1106 comprises generating a bitstream, wherein the bitstream comprises one or more syntax elements encoding the region information and one or more syntax elements encoding the film grain parameters.

Figure 10:
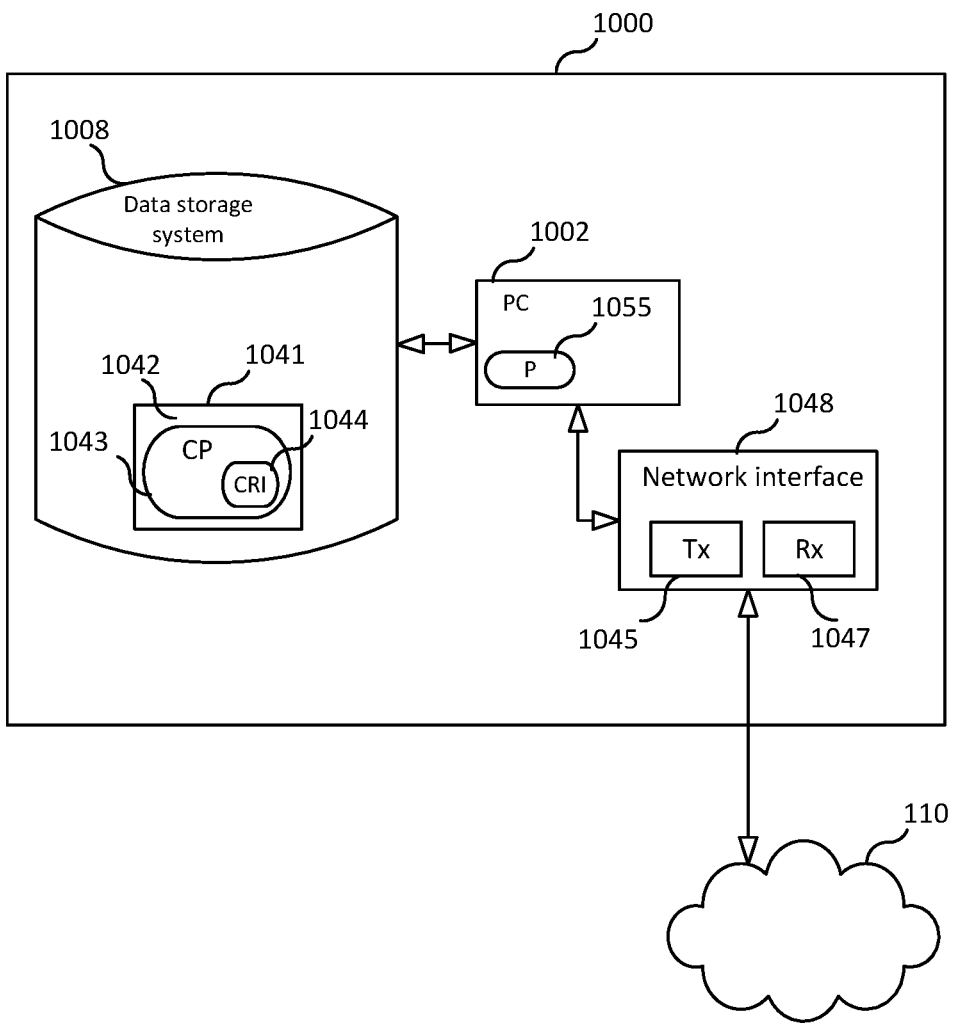
FIG. 10 is a block diagram of an apparatus according to an embodiment.

FIG. 10 is a block diagram of an apparatus 1000 for implementing decoder 204 and/or encoder 202 according to some embodiments. When apparatus 1000 implements a decoder, apparatus 1000 may be referred to as a "decoding apparatus 1000," and when apparatus 1000 implements an encoder, apparatus 1000 may be referred to as an "encoding apparatus 1000." As shown in FIG. 10, apparatus 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1000 may be a distributed computing apparatus); at least one network interface 1048 comprising a transmitter (Tx) 1045 and a receiver (Rx) 1047 for enabling apparatus 1000 to transmit data to and receive data from other nodes connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes apparatus 1000 to perform steps described herein (e.g., steps described herein with reference to the flowcharts). In other embodiments, apparatus 1000 may be configured to perform steps described herein without the need for code. That is, for example, PC 1002 may consist merely of one or more ASICs. Hence, the features of the embodiments described herein may be implemented in hardware and/or software.

SUMMARY OF VARIOUS EMBODIMENTS

A1. A method (700) for applying film grain to a picture decoded from a bitstream, the method comprising: decoding region information from syntax elements in the bitstream; deriving, based on the region information, a number of regions in the picture, wherein the number of regions is at least two; deriving, based on the region information, a region raster-scan order for a first region of the at least two regions; and decoding the first region, wherein the decoding of the first region comprises applying film grain to the first region in accordance with the region raster-scan order.

A2. The method of embodiment A1, wherein a region is one of a subpicture or a slice of the picture.

A3. The method of any one of the foregoing embodiments, wherein a region is a rectangular region.

A4. The method of any one of the foregoing embodiments, further comprising: deriving, based on the region information, a second region raster-scan order for a second region of the at least two regions; and decoding the second region, wherein the decoding the second region comprises applying film grain to the second region in accordance with the second region raster-scan order.

A5. The method of any one of the foregoing embodiments, further comprising: outputting the decoded picture.

A6. The method of any one of the foregoing embodiments, wherein the region raster-scan order comprises a block-based raster-scan order for a plurality of blocks in the first region, the method further comprising: applying film grain to the plurality of blocks in the first region in accordance with the block-based raster-scan order.

A7. The method of any one of embodiments A1-A5, wherein the region raster-scan order comprises: (i) a block-based raster-scan order for a plurality of blocks in the first region and (ii) a respective raster-scan order within each block of the plurality of blocks in the first region, the method further comprising: applying film grain to a first block of the plurality of blocks in the first region in accordance with the block-based raster-scan order and the respective raster-scan order within the first block.

A8. The method of any one of the foregoing embodiments, further comprising: determining whether a first block and a second block share a common block edge within the picture; determining whether the first block and the second block that share the common block edge within the picture belong to a same region; and in response to a determination that the first block and the second block belong to the same region, applying a film grain deblocking filter to the common block edge.

A9. The method of embodiment A8, further comprising: in response to a determination that the first block and the second block that share the common block edge do not belong to the same region, determining not to apply a film grain deblocking filter to the common block edge.

A10. The method of any one of the foregoing embodiments, wherein the applying film grain to the first region comprises: generating a first seed value for the first region; and initializing a pseudo-random number generator with the first seed value for the first region for use in the applying film grain to the first region.

A11. The method of embodiment A10, the method further comprising: generating a second seed value for a second region of the at least two regions, wherein the second seed value is different than the first seed value; initializing a pseudo-random number generator with the second seed value for the second region; and decoding the second region, wherein the decoding the second region comprises applying film grain to the second region using the pseudo-random number generator initialized with the second seed value.

A12. The method of embodiment A10, the method further comprising: initializing the pseudo-random number generator with the first seed value for a second region of the at least two regions; and decoding the second region of the at least two regions, wherein the decoding the second region comprises applying film grain to the first region using the pseudo-random number generator initialized with the first seed value.

A13. The method of any one of the foregoing embodiments, the method further comprising: deriving a first mode value from syntax elements in the bitstream, wherein the first mode value is equal to a first value or a second value, wherein the first value indicates to apply film grain treating each region of the at least two regions in the picture individually using a respective region raster-scan order for each region, and wherein the second value indicates to apply film grain to each region of the at least two regions in the picture as a whole using a raster-scan order for the picture.

A14. The method of embodiment A13, further comprising: in response to a determination that the first mode value equals the first value, determining whether a first block and a second block that share a common block edge within the picture belong to a same region; and in response to a determination that the first block and the second block belong to the same region, applying a film grain deblocking filter to the common block edge.

A15. The method of embodiment A14, further comprising: in response to a determination that the first block and the second block do not belong to the same region, determining not to apply a film grain deblocking filter to the common block edge.

A16. The method of any one of embodiments A13-A15, further comprising: in response to a determination that the first mode value equals the second value, applying a film grain deblocking filter to all block edges between neighboring blocks in the picture regardless of whether a block edge is also a region edge.

A17. The method of any one of the foregoing embodiments, the method further comprising: deriving a region mode value for each region of the at least two regions from syntax elements in the bitstream, wherein the region mode value is equal to a first value or a second value, wherein the first value indicates to apply a film grain deblocking filter to each block edge within a region except for block edges between neighboring regions, and wherein the second value indicates to apply a film grain deblocking filter to each block edge within a region inclusive of block edges between neighboring regions.

A18. The method of embodiment A17, further comprising: deriving a first region mode value for a first block belonging to the first region; deriving a second region mode value for a second block belonging to a second region, wherein the first block and the second bock share a common block edge within the picture; determining whether the first region mode value equals the second value and the second region mode value equals the second value; and in response to a determination that the first region mode value equals the second value and the second region mode value equals the second value, applying a film grain deblocking filter to the common block edge.

A19. The method of embodiment A18, further comprising: in response to a determination that at least one of the first region mode value or the second region mode value is equal to the first value, determining not to apply a film grain deblocking filter to the common block edge.

A-19.5 The method of embodiment A18, further comprising: determining whether the first region mode value equals the first value and the second region mode value equals the second value; and in response to a determination that the first region mode value equals the first value and the second region mode value equals the second value, applying a film grain deblocking filter to the common edge such that only sample values of samples that belong to the second region.

A20. The method of any one of the foregoing embodiments, further comprising: deriving a first region identifier value for the first region; and generating a first seed value for the first region based on the first region identifier value, wherein the decoding of the first region comprises applying film grain to the first region using the first seed value.

A21. The method of embodiment 20, further comprising: deriving a second region identifier value for a second region of the at least two regions; generating a second seed value for the second region based on the second region identifier value; and decoding the second region, wherein the decoding the second region comprises applying film grain to the second region using the second seed value.

A22. The method of any one of embodiments A20-A21, wherein the first seed value is further based on a picture order count value for the picture.

A23. The method of any one of embodiments A20-A22, wherein the first region is a subpicture and the first region identifier is a subpicture identifier.

A24. The method of any one of embodiments A20-A23, wherein the first region identifier value is obtained from a syntax element in one or more of a picture parameter set, a sequence parameter set, a picture header, or a slice header.

A25. The method of any one of embodiments A20-A24, wherein the first region and the second region share a common vertical region edge.

B1. A method (800) for extracting a bitstream, the method comprising obtaining an input bitstream comprising a coded picture, wherein the coded picture comprises a plurality of regions; extracting a subset of network abstraction layer (NAL) units from the input bitstream, wherein each subset comprises multiple slice data NAL units and wherein each slice data NAL unit is identical to a respective slice data NAL unit in the input bitstream; generating a parameter set NAL unit, wherein the parameter set NAL unit comprises a set of syntax elements representing a number of regions in a decoded picture and a respective spatial position of each region of the number of regions in the decoded picture; and generating an output bitstream comprising the extracted subset of NAL units and the generated parameter set NAL unit, wherein both the input bitstream and the output bitstream specify that film grain shall be applied to a picture decoded from the input bitstream and the output bitstream, and wherein the output bitstream is decodable into an output decoded video sequence, wherein decoded sample values of each decoded region of the output decoded video sequence are identical to sample values of a corresponding decoded region from the input stream.

C1. A method (900) for merging a bitstream, the method comprising: obtaining a first input bitstream comprising a first coded picture; obtaining a second input bitstream comprising a second coded picture; merging a set of network abstraction layer (NAL) units from the first input bitstream and the second input bitstream, wherein the merged set of NAL units comprises at least one slice data NAL unit from the first input bitstream and at least one slice data NAL unit from the second input bitstream and wherein each slice data NAL unit is identical to a respective slice data NAL unit in one of the first input bitstream or the second input bitstream; generating a parameter set network abstraction layer unit, the generated parameter set NAL unit comprising a set of syntax elements representing a number of regions and a respective spatial position of each region of the number of regions in a decoded picture; and generating an output bitstream, wherein the output bitstream comprises the generated parameter set NAL unit and the set of merged NAL units, wherein the first input bitstream, the second input bitstream, and the output bitstream each specify that film grain shall be applied to a picture decoded from the respective bitstream, and wherein the output bitstream is decodable into an output decoded video sequence, wherein decoded sample values of each decoded region of the output decoded video sequence are identical to sample values of a corresponding decoded region from one of the first input stream or the second input stream.

D1. A method (1100) performed by an encoder, the method comprising determining region information, the region information comprising information indicating (i) a number of regions in a picture, wherein the number of regions is at least two, and (ii) a region raster-scan order for a first region of the at least two regions; determining film grain parameters, wherein the film grain parameters are used for applying film grain in the region raster-scan order for the first region of the at least two regions; and generating a bitstream, wherein the bitstream comprises one or more syntax elements encoding the region information and one or more syntax elements encoding the film grain parameters.

D2. The method of embodiment D1, wherein a region is one of a subpicture or a slice of the picture.

D3. The method of any one of the foregoing embodiments, wherein a region is a rectangular region.

D4. The method of any one of the foregoing embodiments (A1-A25, B1, C1, or D1-D3), wherein the region information further comprises a second region raster-scan order for a second region of the at least two regions and wherein film grain will be applied in the second region raster-scan order for the second region of the at least two regions.

D5. The method of any one of the foregoing embodiments (A1-A25, B1, C1, or D1-D4), wherein the region raster-scan order comprises a block-based raster-scan order for a plurality of blocks in the first region.

D6. The method of any one of embodiments D1-D4, wherein the region raster-scan order comprises: (i) a block-based raster-scan order for a plurality of blocks in the first region and (ii) a respective raster-scan order within each block of the plurality of blocks in the first region.

D7. The method of any one of the foregoing embodiments (A1-A25, B1, C1, or D1-D6), further comprising: obtaining a first mode value, wherein the first mode value is equal to a first value or a second value, wherein the first value indicates to apply film grain treating each region of the at least two regions in the picture individually using a respective region raster-scan order for each region, and wherein the second value indicates to apply film grain to each region of the at least two regions in the picture as a whole using a raster-scan order for the picture; and generating a bitstream, wherein the bitstream comprises one or more syntax elements encoding the first mode value.

D8. The method of any one of the foregoing embodiments (A1-A25, B1, C1, or D1-D7), further comprising: obtaining a region mode value for each region of the at least two regions from syntax elements in the bitstream, wherein the region mode value is equal to a first value or a second value, wherein the first value indicates to apply a film grain deblocking filter to each block edge within a region except for block edges between neighboring regions, and wherein the second value indicates to apply a film grain deblocking filter to each block edge within a region inclusive of block edges between neighboring regions; and generating a bitstream, wherein the bitstream comprises one or more syntax elements encoding the region mode value.

D9. The method of embodiment D8, further comprising: obtaining a region identifier for each region of the at least two regions; and generating a bitstream, wherein the bitstream comprises one or more syntax elements encoding the region identifier for each region of the at least two regions.

E1. A computer program (1043) comprising instructions (1044) which when executed by processing circuitry (1002) causes the processing circuitry (1002) to perform the method of any one of the above embodiments.

E2. A carrier containing the computer program of embodiment D1, wherein the carrier is one of an electronic signal, an optical signal, a radio signal, and a computer readable storage medium (1042).

F1. An apparatus (1000), the apparatus being adapted to perform the method of any one of embodiments A1-A25, B1, C1, or D1-D9.

G1. An apparatus (1000), the apparatus comprising: memory (1042); and processing circuitry (1002), wherein the apparatus is configured to perform the method of any one of embodiments A1-A25, B1, C1, or D1-D9.

ADDITIONAL EMBODIMENTS

Embodiment 1

A method for generating and applying film grain to a region S in a picture comprising at least two regions, wherein the region S does not include the top-left CTU of the picture and wherein the film grain generation for region S is done as if region S is a complete separate picture.

Embodiment 2

The method of embodiment 1, wherein the region is one of a subpicture or a slice.

Embodiment 3

The method of any previous embodiment wherein the film grain generation comprises at least one of the following:
- applying film grain in a raster-scan order within each region of the picture
- applying film grain in a block-based raster-scan order within each region of the picture
- applying film grain in a block-based raster-scan order within each region of the picture and raster scan order within each block
- applying block-based film grain that includes determining whether two neighboring blocks belong to the same region, and in response to determining that the two neighboring blocks belong to the same region, applying a film grain deblocking filter to the block edge between the neighboring blocks. Optionally, in response to determining that the two neighboring blocks do not belong to the same region, do not apply a film grain deblocking filter to the block edge between the neighboring blocks.

Embodiment 4

The method of any previous embodiment wherein the film grain generation comprises generating seed values to use for initializing a pseudo-random number generator used in the film grain generation process for each region of the picture, wherein the generated seed value for region S differ to any generated seed value of any other region in the picture.

Embodiment 5

The method of any one of embodiments 1-3, wherein the film grain generation comprises generating a seed value to use for initializing a pseudo-random number generator used in the film grain generation process for each region of the picture, and wherein the seed value to use for each region of the picture has the same value.

Embodiment 6

The method of any previous embodiment, further comprising determining a mode value from one or more syntax elements in the bitstream as equal to a first value specifying that film grain generation for each region is done as if each region is a complete separate picture, wherein the mode value being equal to a second value specifies that film grain generation for the picture would be done as if the picture consisted of one single region.

Embodiment 7

The method of any previous embodiment, further comprising generating a seed value for a pseudo-random number generator wherein the seed value generation is based on a region ID value that is decoded from the bitstream for the coded region S.

Embodiment 8

The method of embodiment 7 above, wherein the seed value is based on both a region ID value that is decoded from the bitstream for the coded region S and a POC value that is determined for the picture containing the region S.

Embodiment 9

The method of the previous two embodiments 7 or 8, wherein the region is a subpicture and the region ID is a subpicture ID.

Embodiment 10

The method of any of the previous three embodiments, 7-9, wherein the region ID is obtained from a syntax element in one of a picture parameter set, PPS, a sequence parameter set, SPS, a picture header or a slice header.

Embodiment 11

A method for bitstream extraction or merge operations for regions using film grain wherein the sample values after film grain for any region S stays identical regardless of the operations

Additional Embodiments

The method of any of the previous embodiments wherein a region is a rectangular region.

The method of any of the previous embodiments wherein a region is at least one of a slice and a subpicture.

While various embodiments are described herein (including in the Appendix), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The following disclosure describing an embodiment in form of a standard contribution originally appeared in the Appendix to U.S. Provisional Application No. 63/216,262 filed on Jun. 29, 2021.

Abstract

This contribution proposes the following changes to the VVC video coding specification:

Add support for subpicture independent generation of film grain in addition to picture based film grain generation. Two options for supporting this is provided, the first is to add a mode flag in the SPS, gated by the sps_film_grain_enabled_flag syntax element, and the second is to re-use the existing sps_subpic_treated_as_pic_flag[ ] syntax elements.

Modify a film grain seed generation process for the subpicture independent film grain mode to include the value of the sh_subpic_id syntax element (the subpicture ID).

Modify the film grain generation process for the subpicture independent film grain mode to generate the film grain subpicture by subpicture in a raster-scan order.

1. Introduction

Normative film grain generation based on the SMPTE RDD 5 (2006) specification is here assumed to have been adopted to VVC. The adopted method is a picture based method in that it does not take any picture partitioning into account.

2. Problem Statement

The picture based film grain process in VVC means that the output sample values of one subpicture may depend on the location of the subpicture in the full picture. There are two reasons for this. The first is that the initialization of the pseudo-random number generator in VVC is done once for the picture. This means that the state of the pseudo-random number generator when the generation crosses a subpicture boundary for a subpicture depend on previous subpictures. The second reason is that the generation of film grain is done in a raster scan order for the full picture and not in a raster scan order within each subpicture.

3. Proposal

Option 1—An SPS flag

TABLE 9

| SPS Flag | |
| --- | --- |
| | Descriptor |
| seq_parameter_set_rbsp( ) { | |
| ... | |
| sps_film_grain_enable_flag | u(1) |
| sps_subpic_info_present_flag | u(1) |
| if( sps_subpic_info_present_flag ) { | |
| sps_num_subpics_minus1 | ue(v) |
| if( sps_num_subpics_minus1 > 0 ) { | |
| sps_independent_subpics_flag | u(1) |
| sps_subpic_same_size_flag | u(1) |
| if( sps_film_grain_enable_flag ) | |
| sps_independent_subpics_film_grain_flag | u(1) |
| } | |
| for( i = 0; sps_num_subpics_minus1 > 0 && i <= | |
| sps_num_subpics_minus1; i++ ) { | |
| ... | |
| if( !sps_independent_subpics_flag) { | |
| sps_subpic_treated_as_pic_flag[ i ] | u(1) |
| sps_loop_filter_across_subpic_enabled_flag[ i ] | u(1) |
| } | |
| } | |
| ... | | sps_independent_subpics_film_grain_flag equal to 1 specifies that each subpicture in the CLVS is treated as a picture in the film grain generation process, if applied. sps_independent_subpics_film_srain_flag equal to 0 specifies that each picture in the CLVS are treated as if the picture consists of one single subpicture in the film grain generation process. When not present, the value of sps_independent_subpics_film grain flag is inferred to be equal to 1.

Option 2—Re-Using Existing Flags

TABLE 10

| Re-using existing flags | |
| --- | --- |
| | Descriptor |
| seq_parameter_set_rbsp( ) { | |
| ... | |
| sps_film_grain_enable_flag | u(1) |
| sps_subpic_info_present_flag | u(1) |
| if( sps_subpic_info_present_flag ) { | |
| sps_num_subpics_minus1 | ue(v) |
| if( sps_num_subpics_minus1 > 0 ) { | |
| sps_independent_subpics_flag | u(1) |
| sps_subpic_same_size_flag | u(1) |
| } | |
| for( i = 0; sps_num_subpics_minus1 > 0 && i <= | |
| sps_num_subpics_minus1; i++ ) { | |
| ... | |
| if( !sps_independent_subpics_flag) { | |
| sps_subpic_treated_as_pic_flag[ i ] | u(1) |
| sps_loop_filter_across_subpic_enabled_flag[ i ] | u(1) |
| } | |
| } | |
| ... | | sps_independent_subpics_flag equal to 1 specifies that all subpicture boundaries in the CLVS are treated as picture boundaries and there is no loop filtering or film across the subpicture boundaries. sps_independent_subpics_flag equal to 0 does not impose such a constraint. sps_independent_subpics_flag equal to 1 additionally specifies that each subpicture in the CLVS is treated as a picture in the film grain generation process, if applied. sps_independent_subpics_film_grain_flag equal to 0 specifies that each picture in the CLVS is treated as if the picture consisted of one single subpicture in the film grain generation process. When not present, the value of sps_independent_subpics_flag is inferred to be equal to 1.

sps_subpic_treated_as_pic_flag[i] equal to 1 specifies that the i-th subpicture of each coded picture in the CLVS is treated as a picture in the decoding process excluding in-loop filtering operations. sps_subpic_treated_as_pic_flag[i] equal to 0 specifies that the i-th subpicture of each coded picture in the CLVS is not treated as a picture in the decoding process excluding in-loop filtering operations. sps_subpic_treated_as_pic_flag[i] equal to 1 additionally specifies that the i-th subpicture of each coded picture in the CLVS is treated as a picture in the film grain generation process, if applied. sps_subpic_treated_as_pic_flag[i] equal to 0 specifies that the i-th subpicture of each coded picture in the CLVS is not treated as as a picture in the film grain generation process. When not present, the value of sps_subpic_treated_as_pic_flag[i] is inferred to be equal to 1.

The invention claimed is:

1. A method for applying film grain to regions of a picture, the method comprising decoding region information from syntax elements in a bitstream;

deriving, based on the region information, a number of regions in the picture, wherein the number of regions is at least two;

deriving, based on the region information, a first region raster-scan order for a first region of the at least two regions;

deriving a first region identifier value for the first region;

generating a first seed value for the first region based on the first region identifier value, and decoding the first region, wherein decoding the first region comprises applying film grain to the first region using the first seed value and in accordance with the first region raster-scan order.

2. The method of claim 1, wherein a region is one of a subpicture or a slice of the picture.

3. The method of claim 1, wherein a region is a rectangular region.

4. The method of claim 1, further comprising:

deriving, based on the region information, a second region raster-scan order for a second region of the at least two regions; and decoding the second region, wherein decoding the second region comprises applying film grain to the second region in accordance with the second region raster-scan order, and the second region raster-scan order is different than the first region raster-scan order.

5. The method of claim 1, wherein the method further comprises:

obtaining a second seed value for a second region of the picture; and applying film grain to the second region using the second seed value.

6. The method of claim 1, wherein the region raster-scan order comprises a block-based raster-scan order for a plurality of blocks in the first region, the method further comprising:

applying film grain to the plurality of blocks in the first region in accordance with the block-based raster-scan order.

7. The method of claim 1, wherein the region raster-scan order comprises: (i) a block-based raster-scan order for a plurality of blocks in the first region and (ii) a respective raster-scan order within each block of the plurality of blocks in the first region, the method further comprising:

applying film grain to a first block of the plurality of blocks in the first region in accordance with the block-based raster-scan order and the respective raster-scan order within the first block.

8. The method of claim 1, further comprising:

determining whether a first block and a second block share a common block edge within the picture;

determining whether the first block and the second block that share the common block edge within the picture belong to a same region; and in response to a determination that the first block and the second block belong to the same region, applying a film grain deblocking filter to the common block edge.

9. The method of claim 8, further comprising:

in response to a determination that the first block and the second block that share the common block edge do not belong to the same region, determining not to apply a film grain deblocking filter to the common block edge.

10. The method of claim 1, wherein the applying film grain to the first region comprises:

generating a first seed value for the first region; and initializing a pseudo-random number generator with the first seed value for the first region for use in the applying film grain to the first region.

11. The method of claim 10, further comprising:

generating a second seed value for a second region of the at least two regions, wherein the second seed value is different than the first seed value;

initializing a pseudo-random number generator with the second seed value for the second region; and decoding the second region, wherein the decoding the second region comprises applying film grain to the second region using the pseudo-random number generator initialized with the second seed value.

12. The method of claim 10, further comprising:

initializing the pseudo-random number generator with the first seed value for a second region of the at least two regions; and decoding the second region of the at least two regions, wherein the decoding the second region comprises applying film grain to the second region using the pseudo-random number generator initialized with the first seed value.

13. The method of claim 1, the method further comprising:

deriving a first mode value from syntax elements in the bitstream, wherein the first mode value is equal to a first value or a second value, wherein the first value indicates to apply film grain treating each region of the at least two regions in the picture individually using a respective region raster-scan order for each region, and wherein the second value indicates to apply film grain to each region of the at least two regions in the picture as a whole using a raster-scan order for the picture.

14. The method of claim 13, further comprising:

in response to a determination that the first mode value equals the first value, determining whether a first block and a second block that share a common block edge within the picture belong to a same region; and in response to a determination that the first block and the second block belong to the same region, applying a film grain deblocking filter to the common block edge.

15. The method of claim 1, further comprising:

deriving a region mode value for each region of the at least two regions from syntax elements in the bitstream, wherein the region mode value is equal to a first value or a second value, wherein the first value indicates to apply a film grain deblocking filter to each block edge within a region except for block edges between neighboring regions, and wherein the second value indicates to apply a film grain deblocking filter to each block edge within a region inclusive of block edges between neighboring regions.

16. The method of claim 15, further comprising:

deriving a first region mode value for a first block belonging to the first region;

deriving a second region mode value for a second block belonging to a second region, wherein the first block and the second block share a common block edge within the picture;

determining whether the first region mode value equals the second value and the second region mode value equals the second value; and in response to a determination that the first region mode value equals the second value and the second region mode value equals the second value, applying a film grain deblocking filter to the common block edge.

17. The method claim 1, further comprising:

deriving a second region identifier value for a second region of the at least two regions;

generating a second seed value for the second region based on the second region identifier value; and decoding the second region, wherein the decoding the second region comprises applying film grain to the second region using the second seed value.

18. The method of claim 17, wherein the first region and the second region share a common vertical region edge.

19. The method of claim 1, wherein the first seed value is further based on a picture order count value for the picture.

20. The method of claim 1, wherein the first region is a subpicture and the first region identifier is a subpicture identifier.

21. The method of claim 1, wherein the first region identifier value is obtained from a syntax element in one or more of:

a picture parameter set, a sequence parameter set, a picture header, or a slice header.

22. A computer program product comprising a non-transitory computer-readable medium carrying instructions which when executed by processing circuitry of a decoder, causes the decoder to perform a method comprising:

decoding region information from syntax elements in a bitstream;

deriving, based on the region information, a number of regions in the picture, wherein the number of regions is at least two;

deriving, based on the region information, a first region raster-scan order for a first region of the at least two regions;

deriving a first region identifier value for the first region;

generating a first seed value for the first region based on the first region identifier value; and decoding the first region, wherein decoding the first region comprises applying film grain to the first region using the first seed value and in accordance with the first region raster-scan order.

23. A decoding apparatus, the apparatus comprising:

memory; and processing circuitry, wherein the decoding apparatus is configured to perform a process comprising:

decoding region information from syntax elements in a bitstream;

deriving, based on the region information, a number of regions in the picture, wherein the number of regions is at least two;

deriving, based on the region information, a first region raster-scan order for a first region of the at least two regions;

deriving a first region identifier value for the first region;

generating a first seed value for the first region based on the first region identifier value; and decoding the first region, wherein decoding the first region comprises applying film grain to the first region using the first seed value and in accordance with the first region raster-scan order.

\* \* \* \* \*